US011259097B1

(12) United States Patent
Crawford et al.

(10) Patent No.: US 11,259,097 B1
(45) Date of Patent: Feb. 22, 2022

(54) METHOD AND APPARATUS FOR MANAGING ADVERTISING INSERTION REQUESTS FROM MULTIPLE SOURCES

(71) Applicant: Xandr Inc., New York, NY (US)

(72) Inventors: Scott Crawford, Columbus, NJ (US); Sonya Herrera, Palmer, PA (US)

(73) Assignee: Xandr Inc., New York, NY (US)

( * ) Notice: Subject to any disclaimer, the term of this patent is extended or adjusted under 35 U.S.C. 154(b) by 0 days.

(21) Appl. No.: 17/107,112

(22) Filed: Nov. 30, 2020

(51) Int. Cl.
*H04N 21/234* (2011.01)
*H04N 21/81* (2011.01)
*H04N 21/254* (2011.01)

(52) U.S. Cl.
CPC ......... *H04N 21/812* (2013.01); *H04N 21/254* (2013.01); *H04N 21/23424* (2013.01)

(58) Field of Classification Search
CPC .............................. H04N 21/23424
See application file for complete search history.

(56) References Cited

U.S. PATENT DOCUMENTS 8,856,825 B1 * 10/2014 Mick, Jr ............ H04N 21/2353
725/32

* cited by examiner

*Primary Examiner* — Michael H Hong
(74) *Attorney, Agent, or Firm* — Guntin & Gust, PLC; Dana Lemoine

(57) ABSTRACT

Aspects of the subject disclosure may include, for example, receiving information from a plurality of equipment that is each managed by different entities where the information includes requests for ad insertions, and adjusting the information to generate adjusted information that is compatible with a plurality of multichannel video programming distributor (MVPD) advertising infrastructures and compatible with a plurality of dynamic advertising insertion (DAI) processes that are managed by different DAI entities. Access to at least one of the MVPD advertising infrastructures and access to at least one of the DAI processes to facilitate ad insertion can be provided to each of the plurality of equipment, and a change request can be determined that is associated with inventory. Access to a different one of the DAI processes can be provided to a first equipment of the plurality of equipment to facilitate at least some of the ad insertion according to the change request. Other embodiments are disclosed.

20 Claims, 14 Drawing Sheets

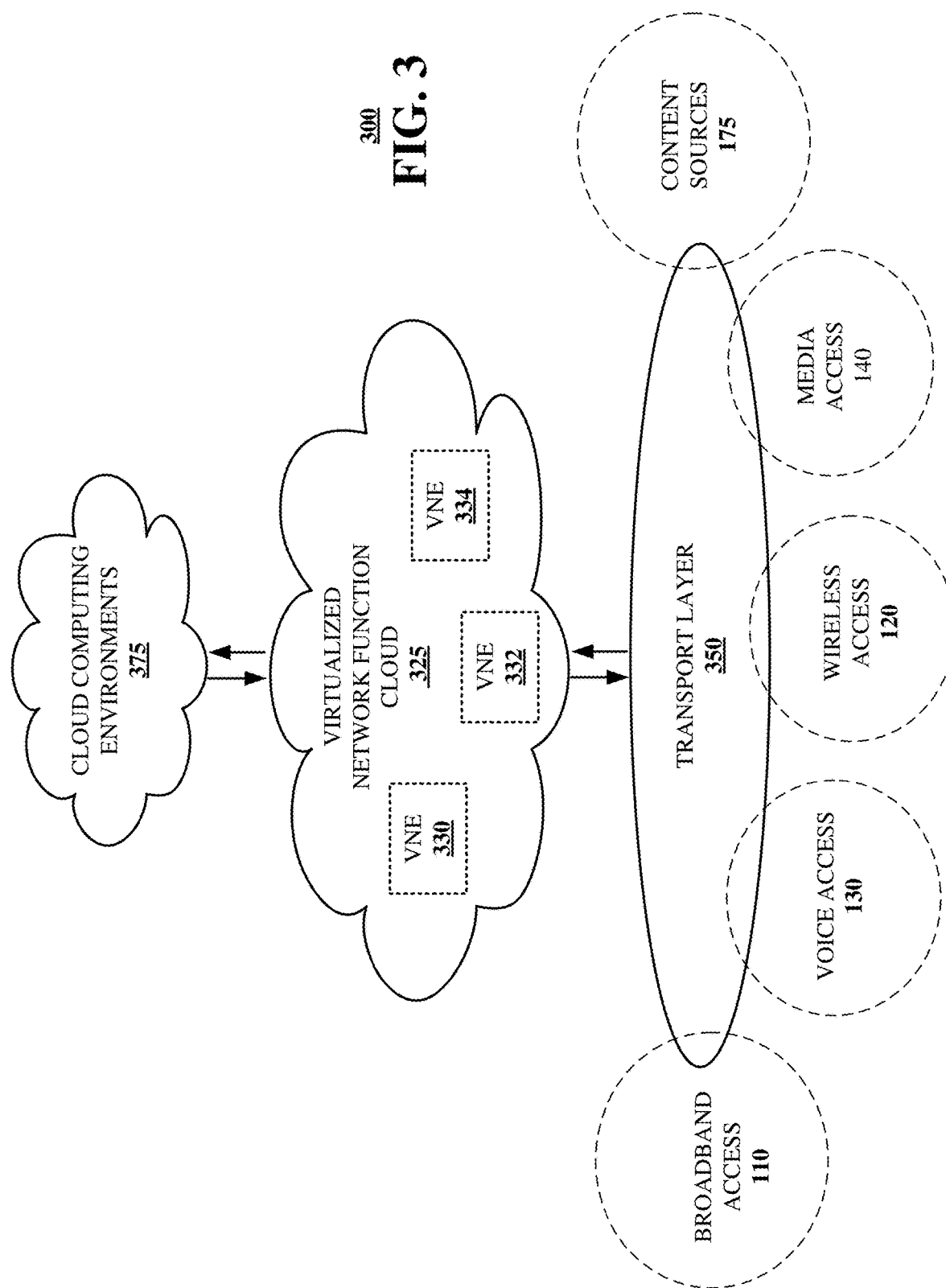

METHOD AND APPARATUS FOR MANAGING ADVERTISING INSERTION REQUESTS FROM MULTIPLE SOURCES

FIELD OF THE DISCLOSURE

The subject disclosure relates to a method and apparatus for managing advertising insertion requests from multiple sources.

BACKGROUND

As the habits and behavior of content viewers continue to evolve, advertisers seek to reach their audiences in operationally efficient ways. Advertising can be a fragmented and inefficient process depending on the type of media service delivering the content. Advertisers often tailor their message to potential consumers and that message can appear across multiple platforms. Publishers desire to increase or maximize the yield efficiency for their ad inventory.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
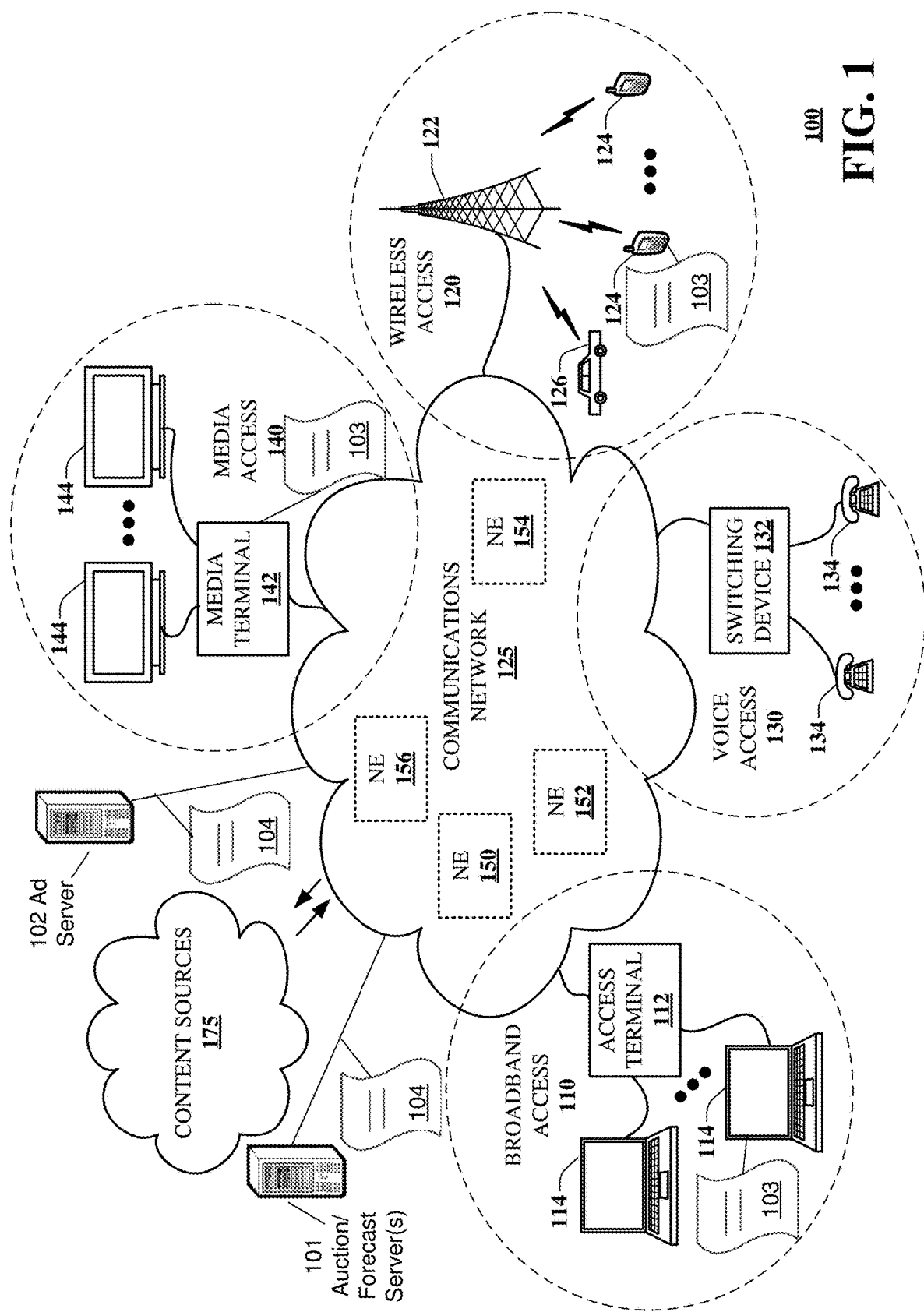
FIG. 1 is a block diagram illustrating an exemplary, non-limiting embodiment of a communications network in accordance with various aspects described herein.

The subject disclosure describes, among other things, illustrative embodiments for advertising insertion which can be managed for multiple entities such that multiple techniques can be applied. For example, a system can provide different equipment of different entities with access to one or more multichannel video programming distributor (MVPD) advertising infrastructures and with access to one or more dynamic ad insertion (DAI) vendor processes to facilitate ad insertion.

In one or more embodiments, a multi-tenancy platform is provided where multiple entities (e.g., different content providers) can communicate their advertising needs to multiple MVPDs utilizing multiple DAI vendors. The multi-tenancy platform can provide an integration layer which facilitates the flow of data into and out of the multi-tenancy platform. For example, the integration layer can be Application Programming Interface (API) wrapper which includes or otherwise utilizes a set of API's and drop-off points for files (e.g., S3 buckets).

In one or more embodiments, the multi-tenancy platform can be a managed service provider which may or may not have its own subscribers or own inventory. In this example, the managed service provider can support and manage campaigns of other entities and to do so can interface with the equipment of each of these other entities. In one or more embodiments, the multi-tenancy platform can be useable with or otherwise interface with multiple DAI vendors and can make use of the tools and platforms provided by those DAI vendors (e.g., Freewheel, Invidi, Google DFP, Appnexus, SpotX, and so forth). In one or more embodiments, the use of multiple MVPD advertising infrastructures and the use of multiple DAI vendor solutions can be done (and switched between including dynamically) without clients needing to adjust data that is inputted into the system or received from the system through use of the set of APIs. Other embodiments are described in the subject disclosure.

One or more aspects of the subject disclosure include a method including providing, by a processing system including a processor, a group of APIs; receiving, by the processing system via the group of APIs, information from equipment of a plurality of content providers that are managed by different provider entities, where the information includes first information from first equipment of a first content provider and second information from second equipment of a second content provider, and where the first and second information includes requests for ad insertions for the first and second content providers, respectively. The method can also include adjusting, by the processing system via the group of APIs, the first and second information to generate adjusted first information and adjusted second information, where the adjusted first and second information is compatible with a plurality of MVPD advertising infrastructures and compatible with a plurality of DAI processes that are managed by different DAI entities; providing, by the processing system to each of the first and second equipment, access to at least one of the MVPD advertising infrastructures and access to at least one of the DAI processes to facilitate ad insertion; determining, by the processing system, a change request associated with inventory of the first content provider; and providing, by the processing system to the first equipment, access to a different one of the DAI processes to facilitate at least some of the ad insertion according to the change request.

One or more aspects of the subject disclosure include a server having a processing system including a processor; and a memory that stores executable instructions that, when executed by the processing system, facilitate performance of operations. The server can receive, via a group of APIs, information from a plurality of equipment that is each managed by different entities, where the information includes requests for ad insertions. The server can adjust, via the group of APIs, the information to generate adjusted information that is compatible with a plurality of MVPD advertising infrastructures and compatible with a plurality of DAI processes that are managed by different DAI entities. The server can provide, to each of the plurality of equipment, access to at least one of the MVPD advertising infrastructures and access to at least one of the DAI processes to facilitate ad insertion. The server can determine a change request associated with inventory; and can provide, to a first equipment of the plurality of equipment, access to a different one of the DAI processes to facilitate at least some of the ad insertion according to the change request.

One or more aspects of the subject disclosure include a machine-readable medium, comprising executable instructions that, when executed by a processing system including a processor, facilitate performance of operations. The operations can include receiving information from a plurality of equipment that is each managed by different entities, where the information includes requests for ad insertions. The operations can include adjusting the information to generate adjusted information that is compatible with a plurality of MVPD advertising infrastructures and compatible with a plurality of DAI processes that are managed by different DAI entities. The operations can include providing, to each of the plurality of equipment, access to at least one of the MVPD advertising infrastructures and access to at least one of the DAI processes to facilitate ad insertion. The operations can include determining a change request associated with inventory; and can include providing, to a first equipment of the plurality of equipment, access to a different one of the DAI processes to facilitate at least some of the ad insertion according to the change request.

Referring now to FIG. 1, a block diagram is shown illustrating an example, non-limiting embodiment of a communications network 100 in accordance with various aspects described herein. For example, communications network 100 can facilitate in whole or in part receiving, via a group of APIs, information from a plurality of equipment that is each managed by different entities, where the information includes requests for ad insertions. The group of APIs can be utilized to adjust the information to generate adjusted information that is compatible with a plurality of MVPD advertising infrastructures and compatible with a plurality of DAI processes that are managed by different DAI entities. Network 100 enables providing, to each of the plurality of equipment, access to at least one of the MVPD advertising infrastructures and access to at least one of the DAI processes to facilitate ad insertion. Network 100 enables determining a change request associated with inventory. Network 100 enables providing, to a first equipment of the plurality of equipment, access to a different one of the DAI processes to facilitate at least some of the ad insertion according to the change request. This process can be repeated for any number of equipment operated by any number of entities. The computing system that performs all or some of these functions can be various devices or combinations of devices including auction/forecast server(s) 101 and/or ad server 102 which can be in communication with the communications network 125.

FIG. 1 illustrates the ad server 102 in communication with the communications network 125, where the ad server can facilitate the process, including delivering of a particular creative of the winning bidder to the end user device presenting the media content which includes the ad space that is being sold. However, one, some or all of the functions described herein can be performed by the server(s) 101, the ad server 102, another server not shown, or any combination thereof, including in a virtual computing device or a distributed processing environment.

One, some or all of the functions described herein can also be performed in a client-side implementation (e.g., utilizing a script executed by the end user device, ad server 102, or any combination thereof) and/or a server-side implementation (e.g., via server(s) 101, ad server 102, another server not shown, or any combination thereof). In one or more embodiments, a CSAI implementation for managing digital advertising can be utilized via a code or script 103 (e.g. a javascript) operating on or otherwise being executed by an end user device that will be rendering the content and ad space. The script 103 can perform various functions including one or more of prebidding, ad insertion, communicating with various devices (e.g., ad server 102 and/or server(s) 101) and so forth. In this example, the script 103 can be utilized in conjunction with one or more of the functions described herein where curated deals are analyzed to determine winning bidders. Data 104 can be communicated, collected, generated and/or analyzed in order to provide various functions for various equipment of various entities, including ad insertion, forecast-shaped, and so forth.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
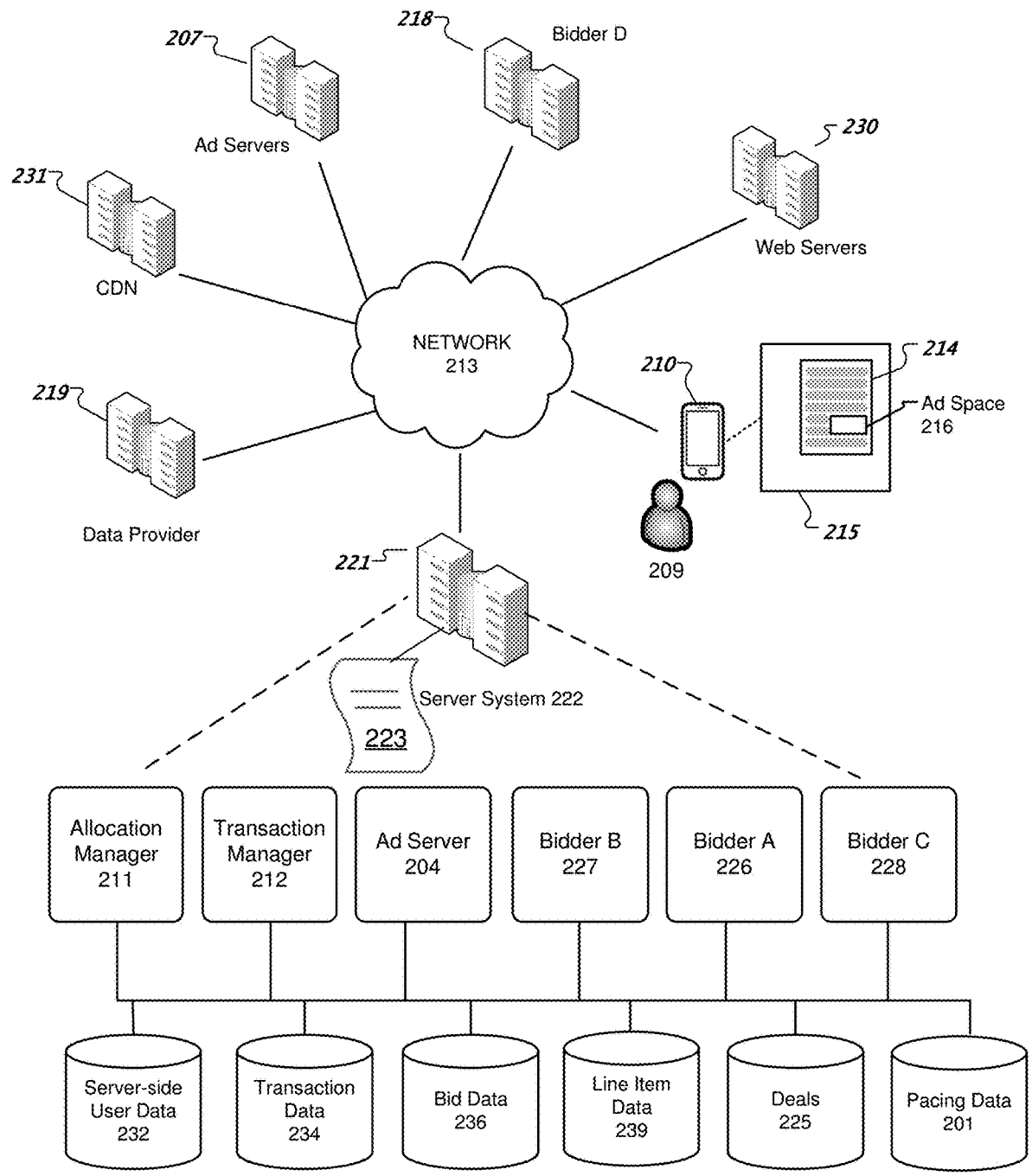
FIG. 2A is a block diagram illustrating an example, non-limiting embodiment of a system functioning within or in conjunction with the communication network of FIG. 1 in accordance with various aspects described herein.

Referring now to FIG. 2A, a block diagram is shown illustrating an example, non-limiting embodiment of a system 200 in accordance with various aspects described herein to provide for electronic advertising which can include a multi-tenancy platform facilitated by API wrapper 223 in which data flow is enabled so that multiple entities (e.g., different content providers) can communicate their advertising needs to multiple MVPDs utilizing multiple DAI vendor platforms. The API wrapper 223 can be an integration layer which facilitates the flow of data into and out of the multi-tenancy platform including a set of API's and drop-off points for files. Various devices and combinations thereof can be utilized to implement the electronic advertising including employing one or more of the devices or functions of system 100 of FIG. 1. System 200 enables management of electronic advertising in a number of different ways which can include access to multiple DAI vendor platforms including simultaneously, serially or both. This provides an advantage over current systems which would require that inputs and outputs be manually reformatted for each of the different MVPD advertising infrastructures and DAI processes, rendering a client with a group of ad insertion processes instead of an integrated process.

In one or more embodiments, the API wrapper 223 can receive information from a plurality of equipment that is each managed by different entities (e.g., the information can include requests for ad insertions). The API wrapper 223 can adjust the information to generate adjusted information that is compatible with a plurality of MVPD advertising infrastructures and compatible with a plurality of DAI processes that are managed by different DAI entities. Access can then be provided, for each of the plurality of equipment, to one, some or all of the MVPD advertising infrastructures while also providing access to one, some or all of the DAI processes to facilitate ad insertion. In one embodiment, if a change request associated with inventory is detected, then access can be provided, for one or more of the plurality of equipment, to a different one or more of the DAI processes to facilitate at least some of the ad insertion according to the change request.

In one or more embodiments, system 200 can utilize pacing data 201 to implement forecast-shaped pacing so that more informed decisions are made as to which line item (e.g., including guaranteed line items) should receive delivery rather than other delivery techniques. In one or more embodiments, the pacing can be applied throughout the lifetime of a line item or at different periods. In one embodiment, forecast-shaped pacing can be applied across different inventory types including websites, video, and so forth. In one embodiment, the pacing data 201 includes or otherwise allows for generating a forecasted supply curve, so that guaranteed line items do not need to try as hard to deliver impressions when inventory is scarce (e.g., late night or early morning). In other words, a pCPM of a guaranteed line item can be significantly lower during these hours when there is less supply. This allows the publisher to take advantage of high CPMs from real-time bidding throughout all hours of the day.

In one embodiment, a server system 222 manages allocating of ad space inventory with respect to various types of content including web pages, video games, videos and so forth. In some embodiments, the server system 222 can provide various functions for electronic advertising including real-time ad space data packaging and auctions. The server system 222 can include hardware components, software components, databases, components executing on the same or on different individual data processing apparatus, and so forth, which can be deployed at one or more data centers 221 in one or more geographic locations. Various configurations of the server system 222 can be utilized to perform one or more of the functions described herein (including functions described with other embodiments). For example, the server system 222 can include one, some, or all of: an allocation manager 211, a transaction manager 212, an ad server 204, and one or more bidders (e.g., bidder A 226, bidder B 227, and bidder C 228). The server system 222 can also perform load balancing and/or provide security, such as managing traffic within a single data center or between multiple data centers, and/or managing data protection and access privilege for tenants served by the data centers 221. In one or more embodiments, the server system 222 can also include or have access to memory resources (e.g., distributed and/or centralized physical storage systems) including one or more databases such as a server-side user data database 232, transaction data database 234, bid data database 236, deals database 225 and/or line item database 239.

In one or more embodiments, a broker can generate a curated deal where the broker aggregates inventory across multiple sellers and offers that up to buyers. The broker can create (e.g., through an API or a web page provided by the server system 222) a curated deal and store the curated deal, such as in the line item database 239, the deal database 225 and/or another database. A curated deal or curation deal line item that has been stored can include various information including one or more of identification of a buyer(s) and/or seller(s), terms of any agreements with the buyer(s) and/or seller(s), targeting information, seller inventory (e.g., publishers, sites, sections, pages, ad units, and so forth), audiences (e.g., behavioral, demographic, and so forth), user geography, user technographics (e.g., devices, operating systems, and so forth), content categories, user frequency and recency restrictions, other custom information the seller knows about the user or inventory, and so forth.

In one or more embodiments, a seller can negotiate with a buyer and can reach an agreement on pricing or other terms on an ad space inventory of the seller. The seller can create (e.g., through an API or a web page provided by the server system 222) a deal (e.g., implemented as a data object) for the agreement and store the deal in the deals database 225. A deal stored in the deals database 225 can include one or more of an identifier for the seller, an identifier for a buyer, an identifier for the deal, an identifier of an ad space inventory of the seller, and a floor price for an ad space in the ad space inventory. For instance in one embodiment, the floor price can specify a minimum bid price for the buyer. In one embodiment, the deal can also include flight dates (e.g., start and ending dates for the deal), one or more user target segments, and/or an auction type. The auction type can specify whether the deal is private or public. In one embodiment for the private auction type, auctions for ad spaces of the deal can be open only to buyers having agreements with the seller on the deal's corresponding ad space inventory. In another embodiment for the public auction type, auctions for ad spaces of the deal can be open to every eligible buyer and not limited to buyers having agreements with the seller on the deal's corresponding ad space inventory.

In one embodiment, a graphical user interface 214 of a software application 215 executing on client device 210 of a user 209 can include an ad space 216 and a corresponding ad tag. The application 215 can be a web browser application, or a software application such as a game application or a maps application. The application 215 can retrieve content presented via the user interface 214 (e.g., a web page) through one or more data communication networks 213 (e.g., the Internet) from, for example, web servers 230 of a publisher, although various sources of content can be utilized. For instance, a web page displayed in a browser window of a web browser (e.g., executing on a personal computer or a media processor) can include an ad space on the web page and a corresponding ad tag. The client device 210 can be various types of devices including a mobile phone, a smartphone, a smart watch, a tablet computer, a personal computer (e.g., laptop computer, desktop computer, etc.), a game console, a vehicle media system or any other end user device. The example of system 200 illustrates an ad space on a web page, however, the system (including forecast-shaped pacing techniques) can be applied across various inventory types and combinations of those types, including video.

In one embodiment, the ad tag can include a Uniform Resource Locator (URL)) address (or other addressing indicia) of a device or system from which an ad will be requested (e.g., a URL for the server system 222), statements (e.g., Hypertext Markup Language (HTML) statements) for retrieving and displaying a creative, and/or instructions (e.g., JavaScript instructions) for retrieving and displaying a creative (e.g., displaying the creative in a frame, for example a 160 pixel×600 pixel iframe). In one embodiment, executing the ad tag can cause the application 215 to send (e.g., through the network 213) an ad request or ad call to the addressed device or system (e.g., to server system 222). In some implementations, the application 215 sends an ad request to the server system 222 via another advertising server system such as an ad exchange. In one embodiment, the ad request can include information about the available ad space 216 (e.g., a size for the ad space, an identifier for the publisher), user information (e.g., an identifier of the user 209, data describing the user 209, an Internet Protocol or IP address of the device 210, etc.), and/or system information (e.g., types of the browser and the client device). In one embodiment, the ad request can be composed in JavaScript Object Notation (JSON) or Extensible Markup Language (XML) format and transmitted to the server system 222 using Hypertext Transfer Protocol (HTTP) protocol (e.g., using HTTP POST request method). Although, other ad request formats and transmission methods can be utilized.

In one embodiment, the allocation manager 211 or other components of the server system 222 can attempt to allocate portions of ad space inventory to buyers. A buyer can be an advertiser (e.g., a credit card company, a sportswear company), an ad network, an ad exchange, an advertising agency, or another entity. A seller can be a publisher (e.g., newspaper or social network), an online streaming or gaming service, an ad exchange, an ad network or another entity. In one embodiment, a broker can be an entity that is distinct from the buyers and sellers or can be one of the sellers.

In one embodiment, the allocation manager 211 or other components of the server system 222 can process ad requests, allocate ad space inventory referenced by the ad requests to buyers (e.g., based on agreements between brokers, buyers and/or the seller of the ad space inventory, based on the results of auctions, and so forth), send relevant information to advertisers, return creatives to the browsers or other applications, maintain or otherwise monitor billing and usage data for advertisers and publishers, and/or enforce policies or business rules including quality standards, yield optimization policy, competitive separation, brand safety, frequency capping, and so forth.

In one embodiment, a seller can negotiate an agreement with a buyer on pricing or other terms for an ad campaign. The seller and/or the buyer can create (e.g., through an API or a web page provided by the server system 222) one or more line items (e.g., implemented as data objects) representing the terms of the agreement and store the line items in the line item data database 239. As another example, a buyer can use pre-bidding techniques to place bids on an instance of ad space. For instance, a client-side auction can be conducted such as before the application 215 sends the ad request to the server system 222, although other timing could also be utilized, as well as other pre-bidding techniques including a server-side auction. The seller and/or bidders can create (e.g., through an API or a web page provided by the server system 222) one or more line items (e.g., implemented as data objects) representing the bidders' pre-bids. In these examples, a line item's parameters can include, without limitation, an identifier of a seller, an identifier of a buyer, identifiers of one or more ad spaces from the seller's ad space inventory, ad tags of one or more creatives from the buyer's ad campaign, flight dates (e.g., start and ending dates for the ad campaign), one or more user target segments, and/or a price for filling an instance of an ad space with a creative from the buyer's ad campaign. In one embodiment, for line items associated with ad campaigns, the value of the price parameter can be a static price based on the terms of the agreement between the buyer and seller. In one embodiment, for line items associated with pre-bids, the price can be determined based on the buyer's pre-bid.

In one embodiment, the allocation manager 211 or other component of the server system 222 can compare data associated with the instance of the ad space to the parameters of the line items in the line item data database 239 and where more than one line item matches the ad request, the allocation manager 211 can apply prioritization rules to determine winning bids or deals.

Various data can be utilized as part of the management and bid selection process, including data associated with the instance of the ad space 216 such as user segment data and/or user behavioral data. For example, user segment data can include demographic information, such as one or more of age, gender, location, school, and occupation. Other user segment data are possible. User behavioral data can include data associated with a user's online activities, for example, that the user put an item in a shopping cart, the user searched for an item, the user visited an online store (e.g., within a particular time period) that sells the item, and/or a frequency the user searched for the item. Other user behavioral data are possible. Data associated with the instance of the ad space 216 can include contextual data. In one embodiment, contextual data can include the type of the user interface 214 (e.g., a home page, a user interface of a game application, etc.), structure of the user interface 214 (e.g., a number of ads on the user interface 214), content of the user interface 214 (e.g., game, finance, sports, travel, content not suitable for children), an identifier of the ad space, the dimensions of the ad space, and/or timing data (e.g., the current month, day of the week, date, and/or time). Other contextual data are possible.

In one embodiment, user segment data (e.g., demographic information) can be provided by a user to a publisher when the user accesses websites or applications published by the publisher. Some user segment data (e.g., location) can be determined by data associated with the user's client device (e.g., client device 210), such as an Internet Protocol (IP) address associated with the client device. User behavioral data can be collected in various ways such as by an application (e.g., application 215) executed on a user's client device (e.g., client device 210). Contextual data can be determined in a number of different ways such as by analyzing content (e.g., words, semantics) presented in the user interface, transmitted to the server system 222 with the ad request, or obtained using any other suitable technique. Other techniques can be utilized for gathering various data that facilitates decisions by the buyers.

A buyer, seller and/or broker can acquire data associated with an ad space from the ad space's publisher and/or from a data provider 219 (e.g., Proximic of Palo Alto, Calif.). In one or more embodiments, the buyer, seller and/or broker can store user data in the server-side user data database 232. For instance, the buyer can store in the server-side user data database 232 mappings between user identifiers and user segments.

In some embodiments, the allocation manager 211 or other component of the server system 222 can enforce or otherwise implement allocation policies designed to enhance the seller's revenue while also adhering to the terms of the seller's ad campaign agreements. For example, when an ad campaign line item and a pre-bid line item match an ad request, and the pre-bid line item's price for the ad space exceeds the ad campaign line item's price, the allocation manager 211 can allocate the ad space to the pre-bidder, rather than the ad campaign partner. On the other hand, if allocating the ad space to the pre-bidder would jeopardize the system's ability to meet the terms of its agreement with the ad campaign partner, the allocation manager 211 can allocate the ad space to the ad campaign partner, even though the ad campaign line item's price is lower than the pre-bid line item's price.

The server system 222 (e.g., via the allocation manager 211) can select one of the matching line items to fill the ad space based on any suitable information, including, without limitation, forecast-shaped pacing information, bid prices, curated deal terms, prioritization rules, line items' parameters (e.g., the price parameters), terms of ad campaign agreements, and/or status of current ad campaigns (e.g., current pacing of the ad campaign). In one or more embodiments, line items can include priority parameters that represent a priority rank or a priority tier of the line item. In one embodiment, the allocation manager 211 or other component of the server system 222 can select a line item to fill an ad space based, at least in part, on the priority parameters of the matching line items.

In one or more embodiments, a client device 210 can conduct a client-side auction before sending the ad request to the allocation manager 211. During the client-side auction, the client device 210 can receive one or more pre-bids for the ad space from one or more pre-bidding partners. The client device 210 can send the pre-bids to the allocation manager 211 such as by adding data indicative of the pre-bids to a URL (e.g., a URL that the software application 215 calls to send an ad request to server system 222), for example, the pre-bidder identifier and pre-bid value can be encoded as key-value pairs in the URL's query string. After the software application 215 calls the URL to send the ad request to the server system 222, the allocation manager 211 or other component of the server system 222 can parse the URL's query string to determine the pre-bidder identifier and the pre-bid value for each pre-bid.

In one or more embodiments, the allocation manager 211 or other component of the server system 222 can also receive creative data from client device 210 for the pre-bids such as creative identifier or URL being added to the query string. In one or more embodiments, the server system 222 can allocate ad space to a buyer without conducting a server-side auction.

In one or more embodiments, the transaction manager 212 or other component of the server system 222 can implement an auction system that facilitates transactional aspects of ad space inventory and impression trading involving brokers, buyers and sellers. For example, the transaction manager 212 can process requests (e.g., deal or RTB requests) received from the allocation manager 211, conduct auctions (e.g., on behalf of sellers and/or brokers), return creatives to the allocation manager 211 or the software application 215 executing on the client device 210, and/or return auction-result data, for example. The transaction manager 212 can store in the transaction data database 234 various transaction information for each ad space that is transacted by the transaction manager 212 or other components of the server system 222.

In one or more embodiments, a bidder system or bidder (e.g., bidder A 226) can perform bidding operations on behalf of a buyer. For example, the bidder can receive bid-specific information (e.g., one or more of maximum bid price, target user areas or segments, start and end dates, budget) as input and can generate a bid for a particular instance of an ad space inventory. As another example, a buyer can set up (e.g., through an API or web pages provided by the server system 222) a campaign targeting an ad space inventory with a set of bid-specific information for the ad space inventory and store the bid-specific information in bid data database 236. In one or more embodiments, a bidder can operate outside of or otherwise remote from the server system 222, such as bidder D 218. Continuing with this example, the transaction manager 212 can generate a bid request including information about the ad space, the user, and so forth, and can send the bid request to multiple bidders such as bidder A 226, bidder B 227, and bidder C 228, as well as via the networks 213 to servers of other bidders (e.g., bidder D 218). These bid requests (which can be encoded or compressed) can be composed in various formats such as JSON format and sent to bidders utilizing various protocols such as HTTP POST. The winning bid price can be the highest bid price, a second highest bid price of the auction as determined by Vickrey auction or other second-price auction mechanisms or determined via another winning bidding mechanism or policy.

In one or more embodiments, each bidder can determine an appropriate bid based on its own requirements (e.g., budget, targets in placements, and so forth) and can selectively submit a bid response such as including a bid price and/or an identifier of a creative to be served to the transaction manager 212 or other component of server system 222. In one or more embodiments, the transaction manager 212 or other component of server system 222 can determine a winning bid (e.g., a highest bid) among bid responses received within a specified time period (e.g., 100 milliseconds although other time limits can be applied). In one or more embodiments, the transaction manager 212 or other component of server system 222 can provide a creative associated with the winning bid or identification information (e.g., a URL) of the winning bid creative, such as via the allocation manager 211, which can cause the application 215 to display the creative in the ad space in the user interface 214. In one embodiment, the client device 210 can obtain the creative for the winning bid based on a received URL which enables retrieving the creative from another source, such as an ad server (e.g., ad server 204, or ad servers 207 external to the server system 222), or from servers of a content distribution network (CDN) 231. In one or more embodiments for ad campaign line items, the creatives or URLs of the creatives associated with the line items can be provided (e.g., by the buyer) when the line items are created (e.g., through an API or a web page provided by the server system 222). In one or more embodiments for pre-bid line items, the creatives can be provided by the pre-bidders along with their pre-bids.

In one or more embodiments, the ad server 204 can serve creatives to web browsers or other applications. In one or more embodiments, the ad server 204 can make decisions about which creatives to serve, and/or can monitor clicks or other user interactions with creatives. In one or more embodiments, the allocation manager 211 can store in the transaction data database 234 transaction information such as one or more of an identifier of the creative served to the ad space, an identifier of the broker, an identifier of the buyer, the user's identifier, the price of the ad space, an identifier of the ad space, an identifier of the seller of the ad space, and/or a time stamp. Other transaction information of a transaction can also be monitored and stored.

In one or more embodiments, publishers or sellers can allocate portions of their ad space inventory to buyers (e.g., advertisers or ad networks) for the buyers' ad campaigns (e.g., direct ad campaigns or programmatic ad campaigns) through offline agreements. For example, different percentages of the ad space inventory on a landing page of a website during a specified time period (e.g., a week or a month) can be allocated to different advertisers for each of their ad campaigns. These agreements can include a number of terms such as one or more of payment model and/or pricing for the ad space inventory, a desired pacing of the ad campaign (e.g., the time rate at which the publisher's ad spaces are allocated to the ad campaign), targeting parameters (e.g., preferences or limits on which instances of ad space inventory can be allocated to an ad campaign, based on data associated with the ad space inventory), priority of the ad campaign relative to contemporaneous ad campaigns on the publisher's site, and so forth.

In one or more embodiments, these agreements can be implemented and enforced by an allocation manager associated with (e.g., executing on) the publisher's ad server. In one embodiment to implement and enforce the terms of such agreements, the allocation manager can utilize line items and prioritization rules. When a request to fill an available ad space is received, the allocation manager can compare characteristics of the ad space to the parameters of line items representing the publisher's agreements with buyers. If more than one line item matches the ad request (indicating that more than one creative or ad campaign may be eligible to fill the ad space), the allocation manager can apply the prioritization rules and/or pacing criteria to determine which ad campaign or creative fills the ad space.

In one or more embodiments, line items are used to allocate a seller's ad space inventory among buyers in ways that are consistent with the terms of agreements between the seller and the buyers, including terms relating to targeting, pacing, prioritization, number of impressions, and budget constraints. Line items can be implemented or generated in advance of starting an ad campaign, such as where values of parameters of line items (e.g., the values of price and/or prioritization parameters) are set by programmers prior to initiating the ad campaign.

In one or more embodiments, system 200 can enable publishers to make some ad space inventory available to real-time bidders via server-side auctions. In one embodiment, if a publisher's allocation manager determines that no line items match an ad request, the allocation manager can forward the request to an ad exchange, which can offer the ad space to bidders in a server-side auction. In this example, the ad space can then be allocated to the winning bidder, and the system can serve a creative provided by the winning bidder to fill the ad space.

In one or more embodiments, system 200 can enable publishers to implement pre-bidding which can be client-side and/or server-side auctions (for example which take place prior to allocating ad space inventory to the ad campaigns of the publishers' direct or programmatic partners). In one embodiment, when an instance of an ad space is available to fill (e.g., when a browser begins to load a web page with an ad space), a system can initiate an auction by requesting bids from pre-bidding partners. For example, auction data describing the results of the auction (e.g., the identity, bid price, and creative of the winning bidder, or the identities, bid prices, and creatives of multiple bidders) can be provided to the allocation manager, which uses the auction data to determine how to allocate the ad space.

In one embodiment, when a bid for an ad space is received from a pre-bid partner, the allocation manager can search for a line item with a buyer identity parameter that matches the identity of the pre-bid partner and a price (or price range) parameter that matches the value of the partner's bid.

Figure 2B:
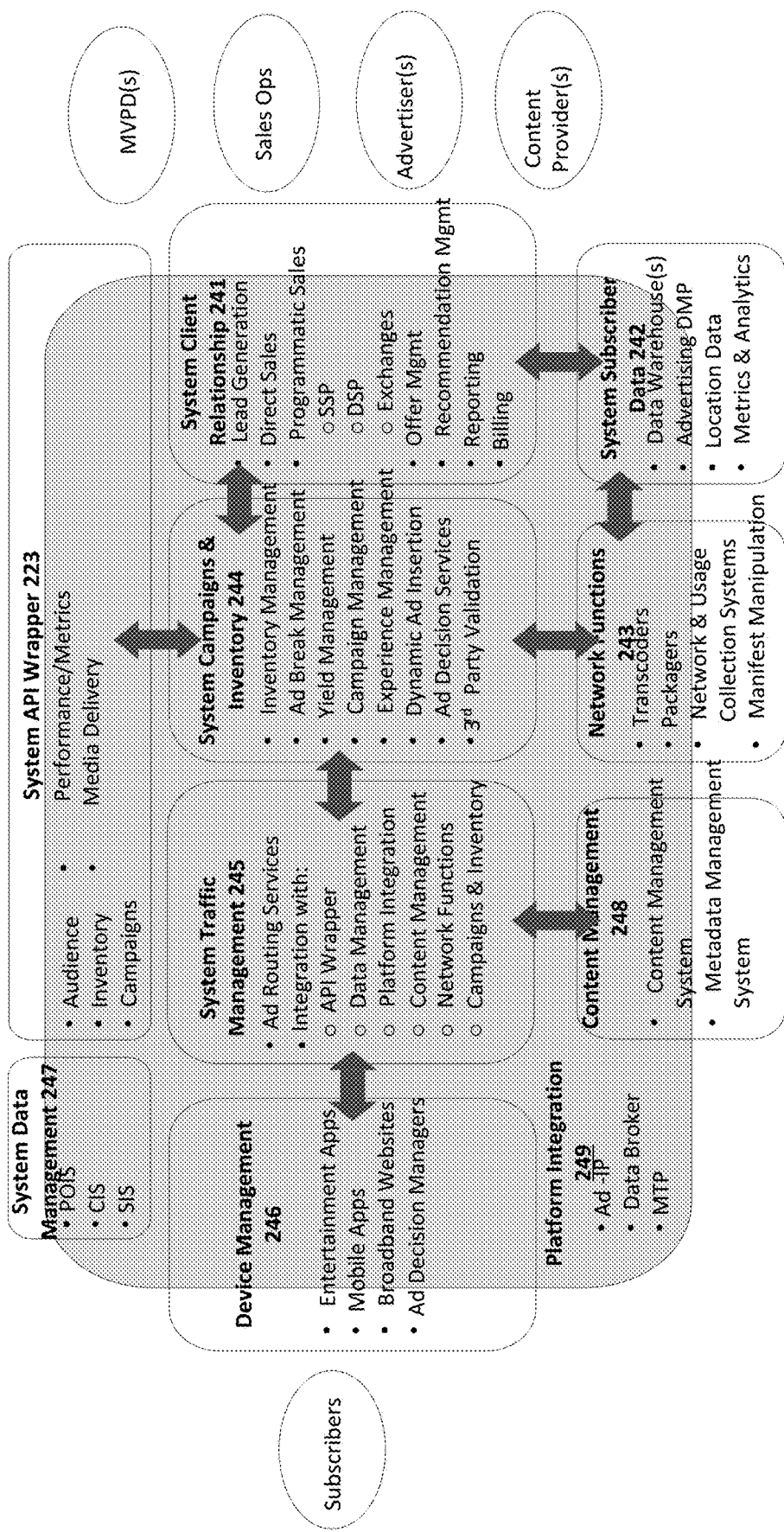
FIG. 2B is a block diagram illustrating an example, non-limiting embodiment of a system functioning within or in conjunction with the communication network of FIG. 1 and the systems of FIG. 2A, 2C-2D, 2F-2G, 2I in accordance with various aspects described herein.

FIG. 2B depicts an illustrative embodiment of an Ad Tech system 240. Ad Tech system 240 can be part of, or can operate in conjunction with, the systems 100, 200 of FIGS. 1 and 2A (or one or more components thereof). Ad Tech System 240 can include various components, systems, and/or functionality including a Client Relationship System 241, a Subscriber Data System 242, a Network Functions System 243, a Campaign and Inventory System 244, a Traffic Management System 245, a Device Management System 246, a Data Management System 247, a Content Management System 248, and a Platform Integration System 249. In one embodiment, some or all of the Client Relationship System 241, the Subscriber Data System 242, the Campaign and Inventory System 244, the Traffic Management System 245, and the Data Management System 247 can be operated, controlled or otherwise managed by a first entity (e.g., a single entity providing a multi-tenancy platform to content providers and advertisers). In another embodiment, one, some or all of the Platform Integration System 249, the Network Functions System 243, the Content Management System 248, and the Device Management System 246, can be operated, controlled or otherwise managed by another entity or entities that are distinct from the single entity providing the multi-tenancy platform. Other configurations of operational control by the same or different entities can also be utilized in system 240. In one embodiment, one, some or all of the Network Functions System 243, the Content Management System 248, and the Device Management System 246, can operate via plug-in integration. These various components, systems, and/or functionality described above can operate in various configurations including distributed and centralized configurations, and configurations other than what is illustrated in FIG. 2B can also be utilized. Ad Tech System 240 enables management of advertising across different platforms utilizing different solutions which can include managing of inventory of subscribers and campaigns of clients including various content providers and MVPDs. In one or more embodiments, equipment of other entities can utilize or otherwise interact with the system 240 (e.g., via the platform integration system 249 and/or via the API wrapper 223, including subscriber equipment, MVPD equipment, Sales Operations equipment, advertiser equipment and/or content providers.

As described herein, the system 240 can include or otherwise utilize an API wrapper 223. Ad Tech system 240 can also include components and perform functions described with respect to U.S. Patent Application Publication 20190174156 filed Dec. 4, 2017, the disclosure of which is hereby incorporated by reference herein, including supporting cross-platform addressable advertising for any number of content providers and/or advertisers.

The API wrapper 223 can operate as an integration layer so that a multi-tenancy platform is provided where multiple entities (e.g., different content providers) can communicate their advertising needs to multiple MVPDs utilizing multiple DAI vendors. The API wrapper 223 allows for the flow of data into and out of the multi-tenancy platform. For example, the API wrapper 223 can include or otherwise utilize a set of API's and drop-off points for files (e.g., S3 buckets). Ad Tech System 240, through use of the API wrapper 223, can provide different equipment of different entities with access to one or more MVPD advertising infrastructures and with access to one or more DAI vendor processes to facilitate ad insertion. Ad Tech System 240 provides for a dynamic process in which various changes can be accounted for including utilizing one or more different DAI processes (e.g., managed by different DAI entities) and/or utilizing one or more different MVPD advertising infrastructures to facilitate at least some ad insertion according to the requested change. In this example, the API wrapper 223 can translate or otherwise adjust information so that it is compatible with the newly selected MVPD advertising infrastructure(s) and compatible with the newly selected DAI processes.

In one embodiment, the Ad Tech system 240 can be employed by a content provider which can be approached by a client who wishes to advertise for a product, such as cars. The advertiser selects various traits for the advertising campaign, such as gender, income and so forth. In one embodiment, the advertising campaign has an advertising objective to present an advertising message for these particular subscribers for that product across a variety of devices that a subscriber may employ. In one or more embodiments, these subscribers can be identified, an inventory of advertising messages can be accessed, and/or the various user equipment of these selected subscribers can be monitored. For example, when the identified subscriber is consuming media content, or other content, from the service provider or other third party providers, an appropriate break for advertising content can be predicted to occur. In one embodiment, an ad decision manager can choose an ad message to be presented to the subscriber on whatever particular device the subscriber is engaged with during that break for advertising content. In some embodiments, one particular communication device or computing device of the group of subscriber devices can be preferred or targeted by the advertising objective. In other embodiments, advertising during one of a particular activity or media consumption may be preferred by the advertising objectives.

In one embodiment, an advertising campaign can be defined. For example, a dashboard, a portal, and a lead generation can be provided. For instance, entry of data can be enabled or supported for use in defining audience segments, definitions for the ad campaign, and an allocation of an inventory of advertising content, as well as other information or content as required.

In one embodiment, a service provider can have internal control over an advertising campaign within the Ad Tech System 240 while also providing external access to various clients and/or content providers. For example, the external access could include the creation or submission of advertising content, feedback for the effectiveness of the advertisements, as well as billing and other accounting needs. For instance, the dashboard can provide an interface for internal management of the ad campaign, such as from conception of the advertising campaign to the delivery of advertising content to the targets of the advertising campaign. In one embodiment, the dashboard can provide internal management options for advertising campaigns, including automated management and completion, initial forecasting and planning—including inventory opportunities, and mid-campaign performance and yield optimization.

In one embodiment, a programmatic integration layer can be utilized such that an interface is provided with external supply side platforms (SSPs) which can provide a conduit to allow external entities to interact with the Ad Tech System 240. In another embodiment, demand side platforms (DSPs) can provide access to external inventory. In other embodiments hybrids and/or exchanges can further provide access to the system.

In one or more embodiments, the DSPs are enabled via middleware which can support multiple models including an SSP interaction which allows external entities to purchase internally owned and operated inventory for addressable ad insertion into one of their advertising campaigns (e.g., allowing Ad Tech system 240 the ability to sell-off unsold inventory) and a DSP interaction, which allows the Ad Tech system to purchase externally owned and operated inventory for internally sold addressable ad campaigns, thus providing additional opportunities for the selected audience to view addressable ads.

Interaction between the different components can occur such as via the platform integration system. As an example, the reporting front end, billing, interactive advertising application, metrics and analytics can provide and receive feedback via the platform integration system. For instance, the billing system can support creation of campaign invoicing to advertisers/clients while other systems can manage scheduling for live linear ad campaigns. In one embodiment, the interactive advertising application can provide a platform to support the creation of interactive advertising applications and can associate this with linear ad content. In one embodiment, the metrics and analytics can ingest and store metrics, including ad insertion and ad usage. In another embodiment, the metrics and analytics can also normalize and summarize the acquired metrics, then deliver the metrics to numerous back-end systems.

In one embodiment, data warehouses can provide analytics from a big data section. For example, the data warehouses can be enterprise level repositories at which subscriber data for an interactive content system, a network, and/or a service provide can be stored. Big data can include data lakes and data management platforms. The big data section can receive mobile location data for subscriber device of the interactive content system, network, and/or service provider.

In one embodiment, advertising content, including advertising and messages, can be obtained or generated through an engagement advertising platform which can provide a mechanism to define and generate ad-copy, and which can be associated with cross-platform addressable ad campaigns. In one embodiment, the engagement advertising platform can include ad copy creation functionality, supported by an advertising-specific content management system.

In one embodiment, a subscriber information service (SIS) can be provided to enable a real-time functionality for a cached version of information, linking an ID, such as an identification of a household, a device, a profile, an individual person, to segments. In one embodiment, segments can be a collection of traits targeted by the advertising campaign. For example, the SIS can support real-time queries from an Ad Router such as of the Traffic Management System. In one embodiment, the information provided by the SIS can be managed via a graphical user interface (GUI), which can provide access to a business logic system and database for the platform integration system.

In one embodiment, an interactive ad campaign management system (iACM) can be provided. For example, the yield management system can support opportunity/inventory management while the iACM can maintain and manage a cross platform addressable advertising campaign integrity by controlling a campaign definition, an association with audience segments, an available inventory of advertising content, and/or performance monitoring. In another embodiment, an opportunity catalog can be provided which includes an inventory of available advertising content that can be accessed by the iACM.

In one embodiment, a placement opportunity information system (POIS) is provided that can interact with a yield management system (and/or an opportunity catalog) to ingest break information metadata from the content management system. The POIS can provide data to the yield management system and can support real-time queries from the Ad Router about information regarding dynamic ad routing to a specific ad decision service. In one embodiment, the content management system can ingest entertainment and advertising metadata (both of which can be associated with entertainment and advertising assets), can select the break information (break start/stop, duration, type and ownership) and/or can deliver this information to the POIS.

In one embodiment, the yield management system, as the campaign executes from a start-date to an end-date, can perform a monitoring/managing of the ad campaign (e.g., continuous or periodic), where adjustments are made to improve yield and campaign profitability. These adjustments can involve various changes including utilizing one or more different DAI processes (e.g., managed by different DAI entities) and/or utilizing one or more different MVPD advertising infrastructures to facilitate at least some ad insertion according to the requested change. In this example, the API wrapper 223 can translate or otherwise adjust information so that it is compatible with the MVPD advertising infrastructures and compatible with the DAI processes.

In some embodiments, upon a campaign's completion, campaign metrics can be delivered to a Big Data platform, the traffic and billing systems, the reporting system, and/or metrics and analytics system, where each system can use this information for an appropriate task. In some embodiments, household/subscriber data can be hosted in the data warehouse, the big data platform, various systems or devices operating as Ad Decision Managers (ADMs), and/or the SIS (all of which control, analyze and disperse this data to the necessary systems (e.g., vertical ad insertion systems, wholesalers, programmers, etc.)), while also providing for security, privacy considerations, and where necessary, obfuscation.

In one embodiment, the system 240 can support various advertising campaign management including a digital ACM, broadband ACM, an iTV ACM, and/or a linear addressable OTT ACM. For example, embodiments of the ACM can provide ad campaign management for a specific vertical silo or assigned inventory pools where the ACMs communicate with an ad server for support in campaign ad decisions.

In one embodiment, ad decision services (ADSs) can be utilized with ACM systems, including a digital ADS, a broadband ADS, an iTV ADS, and/or a cloud ADS, where the ad decision services can support the ad decision process, such as based upon campaign data from the iACM, as well as contextual data and subscriber information received in ad decision requests. In one embodiment, an ad decision response can be generated and delivered back to an Ad Router and ad decision managers can allow a client to act upon the ad decision.

In some embodiments, the ad decision services and the ad campaign management system can be provided externally from the system. For example, an external environment can include an external linear ADS in association with an external linear ACM in association with external SIS, CIS, and POIS similar to the internal SIS, POIS, and CIS described herein. In this example, the external SIS, CIS, and POIS can likewise communicate with the platform integration system and Ad Router. In one embodiment, the Ad Router can manage the routing of ad decisions based upon business parameters and instructions received from the POIS. The Ad Router can also communicate insertion metrics back to the Campaigns & Inventory System and/or the Metrics & Analytics System. In one embodiment, the Ad Router can interface with an SIS to obtain knowledge (e.g., traits and segments) about the subscriber ID for which the ad decision is being requested. The ad decision can be made in real-time based upon data received from a variety of sources (entertainment and ad assets—and their availability based upon network information), campaign information, on-going metrics, household traits, contextual information (current/mobile location, entertainment being viewed, date/time, etc.). These exemplary sources can include mobile location data, metrics and analytics, data warehouse, SIS, and external SIS.

In one embodiment, the Device Management System can interact with various client devices which can receive ad content from an Ad Router. For example, ad decision requests can be generated and delivered to the Ad Router (e.g., by the ADMs). The ADMs can receive an ad decision response from the Ad Router and can generate an ad playlist. In some embodiments, the ad playlist can be provided to a respective client device. Various client devices and client applications can be addressed and used by subscribers to view the directed entertainment and advertising content. In one or more embodiments, the client devices can interface with an ADM or directly with the Ad Router to support the insertion of addressable ad assets.

In one or more embodiments, client devices and ADMs can include a broadband/digital ADM, an iTV and commerce ADM, ad OTT ADM, and an addressable ADM. For example, these ADM's can interact with various client devices which can include devices associated with broadband and digital services provided to a subscriber, such as Internet browsing performed at a home computing device or through an application on a mobile media processor; iTV services provided to the subscriber; OTT services being provided to the subscriber, such as viewing OTT media content at a home media process or at a mobile media processor; and/or addressable linear television services or linear OTT services provided to a media processor.

In one embodiment, the Ad Tech System 240 can perform defining and collection of traits for an ad campaign which is utilized to build a segment for reaching an audience. For example, data lakes and data management platforms can be accessed which have obtained information from a variety of sources such as entertainment and ad assets, and their availability based upon network information, campaign information, on-going metrics, household traits, and contextual information (e.g., current location, entertainment being viewed, date/time, and so forth). In one embodiment, input can be received for the attributes of an ad campaign according to an advertising objective that includes desired traits for an audience, or segments, of the advertising campaign, the messages intended for the audience of the advertising campaign, and the devices to which the various messages should be delivered. In one embodiment, based on a predicted break in a linear media content (e.g., live TV delivered by linear traffic system), an inventory management system can be accessed to identify pools of advertising content to be inserted during the upcoming break based on the audience at the device providing the linear media content.

In one embodiment, an inventory management system and a yield optimization system can dissect a campaign across various ad campaign platforms and/or ad insertion platforms, utilizing audience reach, available inventory and any other applicable criterion. In another embodiment, break decisions, inventory decisions, media rights management, and inventory allocation can be accounted for such as by the inventory management system, the content management system, and/or the POIS.

As an example, a content provider can utilize a particular MVPD advertising infrastructure to serve up its inventory ads (e.g., addressable) to subscribers of a related entity. System 240 (via the API wrapper 223) can enable this without requiring different solutions for working with different content providers.

Figure 2C:
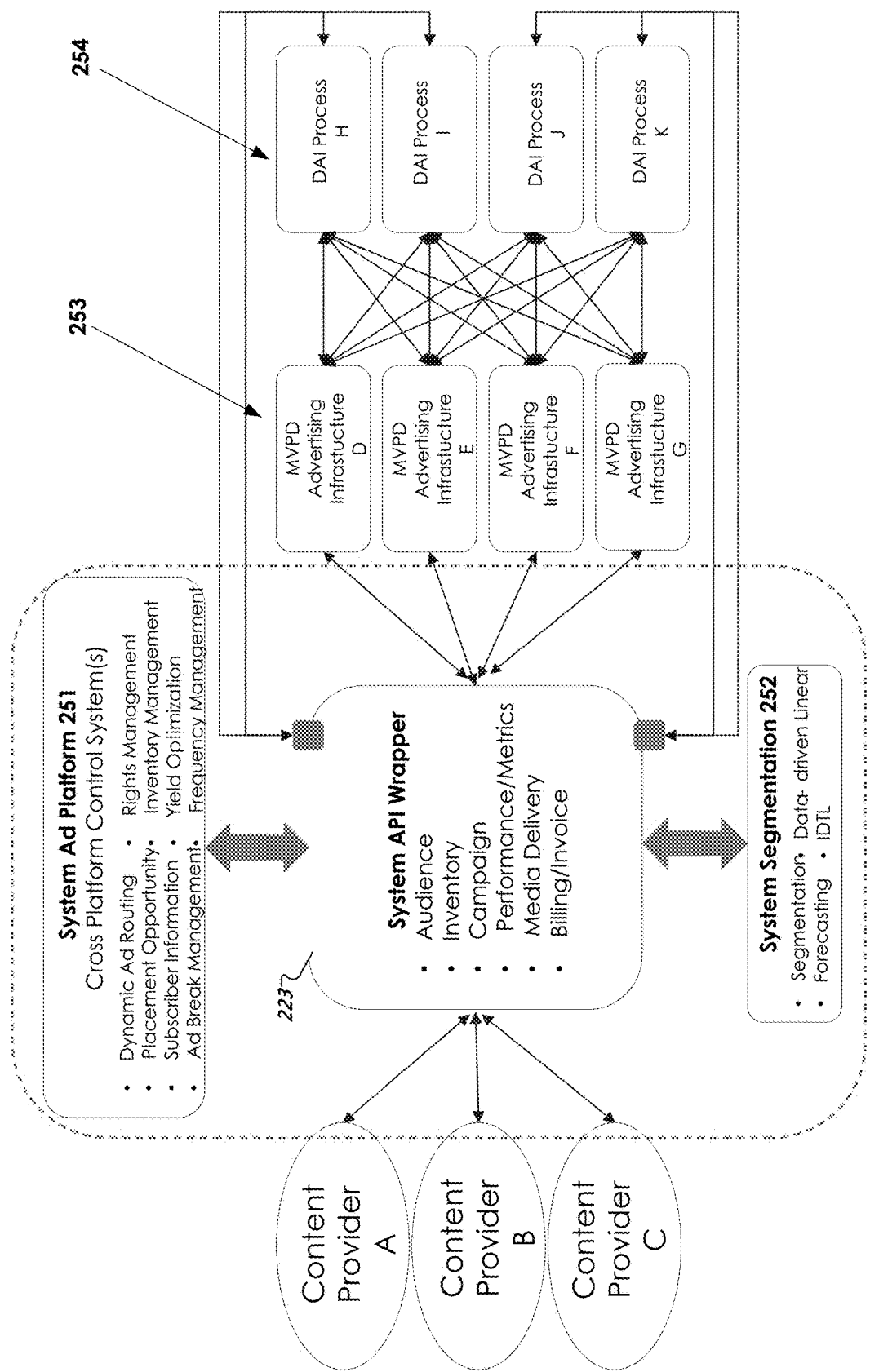
FIG. 2C is a block diagram illustrating an example, non-limiting embodiment of a system functioning within or in conjunction with the communication network of FIG. 1 and the systems of FIG. 2A-2B, 2D, 2F-2G, 2I in accordance with various aspects described herein.

FIG. 2C depicts an illustrative embodiment of a system 250. System 250 can be part of, or can operate in conjunction with, the systems 100, 200, 240 of FIGS. 1, 2A and 2B (or one or more components thereof). System 250 can include various components, systems, and/or functionality including a System Ad Platform 251, System Segmentation, 252 and the API wrapper 223. In one embodiment, some or all of the System Ad Platform 251, System Segmentation, 252 and the API wrapper 223 (or components and functionality thereof) can be operated, controlled or otherwise managed by a single entity providing a multi-tenancy platform to content providers and advertisers. Although, other configurations with multiple entities having control over various components and/or functionality can also be utilized. These various components, systems, and/or functionality described above can operate in various configurations including distributed and centralized configurations, and configurations other than what is illustrated in FIG. 2C can also be utilized. System 250 enables management of advertising across different platforms utilizing different solutions which can include managing of inventory of subscribers and campaigns of clients including various content providers (three of which are shown in FIG. 2C, although any number of content providers can utilize system 250) and MVPDs 253 (four of which are shown in FIG. 2C, although any number of MVPDs can be utilized in system 250). Ad insertion can be implemented across various platforms utilizing any number of different DAI processes 254 (four of which are shown in FIG. 2C, although any number of DAI processes can be utilized by system 250).

As described herein, the system 250 can include or otherwise utilize the API wrapper 223 as an integration layer so that a multi-tenancy platform is provided where multiple entities (e.g., different content providers A, B, C) can communicate their advertising needs with respect to multiple MVPDs (e.g., different MVPD advertising infrastructures D, E, F, G) and can utilize multiple DAI vendors (e.g., different DAI processes H, I, J, K) for satisfying those needs. In one embodiment, the API wrapper 223 allows for the flow of data into and out of the multi-tenancy platform through use of a set of API's and drop-off points for files (e.g., S3 buckets).

System 250, through use of the API wrapper 223, can provide different equipment of different entities with access to one or more MVPD advertising infrastructures and with access to one or more DAI vendor processes to facilitate ad insertion. System 250 provides for a dynamic process in which various changes can be accounted for including utilizing one or more different DAI processes (e.g., managed by different DAI entities) and/or utilizing one or more different MVPD advertising infrastructures to facilitate at least some ad insertion according to the requested change. In this example, the API wrapper 223 can translate or otherwise adjust information so that it is compatible with the newly selected MVPD advertising infrastructure(s) and compatible with the newly selected DAI processes. In one or more embodiments, a change in use of MVPD advertising infrastructures and/or DAI processes can be: responsive to a client request (e.g., by the particular content provider); responsive to acceptance of a recommendation generated by the system ad platform 251 (e.g., according to forecasting data that predicts future activity and recommends changes to MVPD advertising infrastructure(s) and/or DAI processes); and/or automatically performed (e.g., by the system ad platform 251 according to forecasting data) which may or may not be based on messaging, notification or a request for authorization provided to a particular client.

In one or more embodiments, the content providers can input or otherwise select the particular MVPD advertising infrastructures and/or the particular DAI processes that are to be utilized for the content provider for ad insertion. These inputs or selections (or recommendations for same) can also be based on various factors including audience targeting and inventory available. In one embodiment, further custom integration can be provided where a content provider desires to utilize a particular endpoint. In one embodiment, recommendations as to particular MVPD advertising infrastructures and/or the particular DAI processes can be generated by the system ad platform 251 according to feedback based on past results of solution success. For example, changes made to a selection of DAI solutions can be monitored for performance and the performance information can be provided in a recommendation to assist in determining whether to change a DAI solution.

In one embodiment, a campaign can be analyzed based on yield optimization which results in changes to the campaign characteristics (e.g., parameters to 33% addressable, 33% programmatic; 33% hard interconnect (e.g., using other MVPDs bundling deals)). In this example, the changes to the campaign characteristics (if implemented) can result in changes to DAI solution(s) being utilized, such as where particular MVPD advertising infrastructure(s) utilize particular DAI solution(s) and where the changes to the campaign characteristics resulted in changes to the particular MVPD advertising infrastructure(s). In one embodiment, a recommendation can be generated and provided in which a number of different options can be selected, such as different MVPD advertising infrastructure(s) and/or different DAI solution(s). In one embodiment, one or more DAI solutions can be changed to one or more other DAI solutions, which may or may not include maintaining the same MVPD infrastructures, and which may or may not be based on a yield optimization that adjusts the campaign.

Figure 2D:
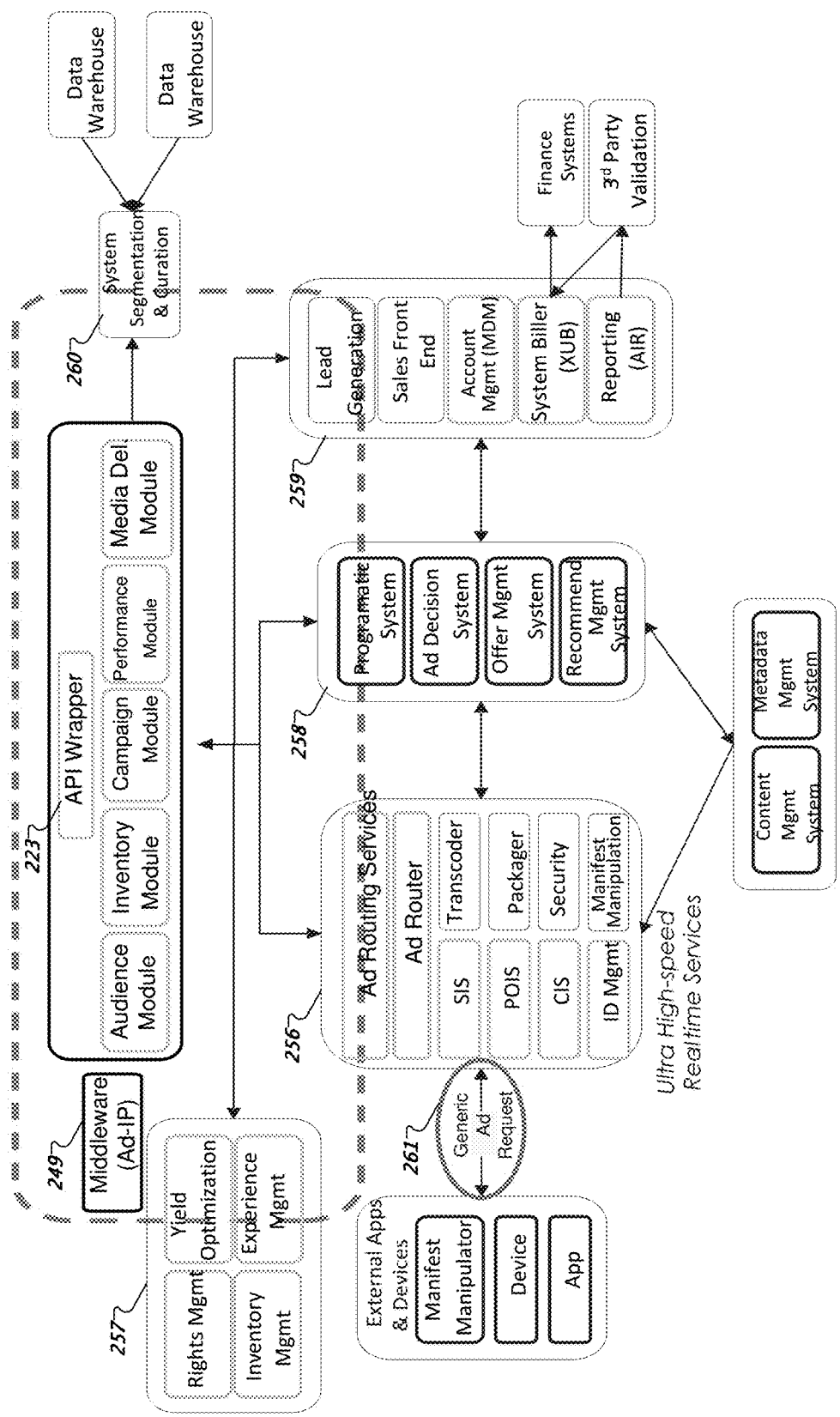
FIG. 2D is a block diagram illustrating an example, non-limiting embodiment of a system functioning within or in conjunction with the communication network of FIG. 1 and the systems of FIG. 2A-2C, 2F-2G, 2I in accordance with various aspects described herein.

FIG. 2D depicts an illustrative embodiment of a system 255. System 255 can be part of, or can operate in conjunction with, the systems 100, 200, 240, 250 of FIGS. 1, 2A, 2B and 2C (or one or more components thereof). System 255 can include various components, systems, and/or functionality including the API wrapper 223 and middleware 249 that can provide platform integration for various systems, devices, module and/or functionality including the ad routing services (and other functionality and devices grouped as 256), yield optimization (and other functionality and devices grouped as 257), programmatic system (and other functionality and devices grouped as 258), sales front end (and other functionality and devices grouped as 259), and segmentation (and other functionality and devices grouped as 260), among others. In one embodiment, one, some or all of the systems, devices, module and/or functionality can be operated, controlled or otherwise managed by a single entity providing a multi-tenancy platform to content providers and advertisers. Although, other configurations with multiple entities having control over various components and/or functionality can also be utilized. These various components, systems, and/or functionality described above can operate in various configurations including distributed and centralized configurations, and configurations other than what is illustrated in FIG. 2D can also be utilized.

FIG. 2D is a systematic view of a multi-tenancy platform where various components, devices and functionality can interface via the middleware Ad IP system 249 and where the API wrapper 223 is an extension of the middleware to enable other entities to make use of different MVPD advertising infrastructures and different DAI processes. The middleware 249 can be located in the cloud, in data centers, or a combination thereof. System 255 enables management of advertising across different platforms utilizing different DAI solutions (e.g., operated by different entities) which can include managing of inventory of subscribers and campaigns of clients including various content providers and MVPDs. Ad insertion can be implemented across various platforms utilizing any number of different DAI processes.

As described herein, the system 255 can include or otherwise utilize the API wrapper 223 as an integration layer so that a multi-tenancy platform is provided where multiple entities (e.g., different content providers) can communicate their advertising needs with respect to multiple MVPDs and can utilize multiple DAI vendors for satisfying those needs. In one embodiment, the API wrapper 223 allows for the flow of data into and out of the multi-tenancy platform through use of a set of API's and drop-off points for files (e.g., S3 buckets).

In one embodiment, the system 255 provides cross-platform management of an advertising campaign where the sales front end can provide desired traits and desired audience reach data to data lakes and data management platforms. For example, data warehouses can return segment results of a subscriber base (e.g., of an interactive content system that employs the system 255) to the sales front end which in turn can communicate with an inventory management system and the yield optimization system. In one embodiment, the inventory management system and the yield optimization system can communicate with ad campaign management systems to target subscribers by the desired segments to provide available advertising inventory to the appropriate devices of targeted subscribers.

The API wrapper 223 enables system 255 to provide different equipment of different entities with access to one or more MVPD advertising infrastructures and with access to one or more DAI vendor processes to facilitate ad insertion. System 255 provides for a dynamic process in which various changes can be accounted for including utilizing one or more different DAI processes (e.g., managed by different DAI entities) and/or utilizing one or more different MVPD advertising infrastructures to facilitate at least some ad insertion according to the requested change. In this example, the API wrapper 223 can translate or otherwise adjust information so that it is compatible with the newly selected MVPD advertising infrastructure(s) and compatible with the newly selected DAI processes. In one or more embodiments, a change in use of MVPD advertising infrastructures and/or DAI processes can be: responsive to a client request (e.g., by the particular content provider); responsive to acceptance of a recommendation (e.g., according to forecasting data that predicts future activity and recommends changes to MVPD advertising infrastructure(s) and/or DAI processes; and/or automatically performed (e.g., according to forecasting data) which may or may not be based on messaging, notification or a request for authorization provided to a particular client.

In one embodiment, system 255 can monitor the insertion of advertising messages into the media content so that the amount of advertising provided according to the advertising campaign can be capped based upon a client constraint. For example, the yield optimization system can interact with a metrics treatment processor which can receive usage metrics from interactive advertising applications and the Ad Router. The Ad Router can receive insertion metrics from internally operated entertainment application(s), externally operated entertainment application(s), various ad decision managers, and manifest manipulators. In one embodiment, the Ad Router can provide data to the ad decision system which can include a digital ADS, a broadband ADS, an iTV ADS, and a cloud ADS. The ad decision system can use frequency data and insertion metrics to modify ad decisions that are made with respect to the various segments and advertising messages. In one embodiment, the ad decision system receives ad frequency data from the various ACMs while providing insertion metrics thereto. In addition, the metrics treatment processor can provide other frequency data that may be ACM specific. In one embodiment, an SIS can receive segment data from data lakes and data management platforms, and can provide the identification of these segments to the Ad Router. In addition, the CIS can provide break data to the POIS, which can provide placement information to the Ad Router.

In one embodiment, system 255 enables delivering campaign performance data and insertion metrics to a billings system. For example, middleware 249 can provide interactivity between the sales front end and a reporting front end. The sales front end can provide information to a billing and invoice section which can provide periodic invoices to clients. In one embodiment, middleware 249 can provide insertion and usage metrics to the billing and invoice section. In one embodiment, the middleware 249 can provide advertising data elements to the reporting front end. In some embodiments, the middleware 249 can receive additional information from various elements including a programmatic integration layer, a metrics and analytics section, data lakes, a yield management section, various ACM's, a $3^{rd}$ party verification system, and/or interactive advertising applications. In one embodiment, the metrics and analytics section can provide insertion metrics to the middleware 249. In some embodiments, the yield management section can provide yield data to the middleware 249. Each of the various ACM's can provide campaign metadata to the middleware 249. The interactive advertising applications can provide usage metrics to the middleware 249.

In one or more embodiments, a generic ad request 261 can effectively provide access to all the different types of parameters/information, without the overhead that would otherwise accompany that information including parameters that vary from one instance or vendor to the next. System 255 can also include components and perform functions described with respect to U.S. patent application Ser. No. 16/786,226 filed Feb. 10, 2020, the disclosure of which is hereby incorporated by reference herein, including utilizing a generic ad request.

Figure 2E:
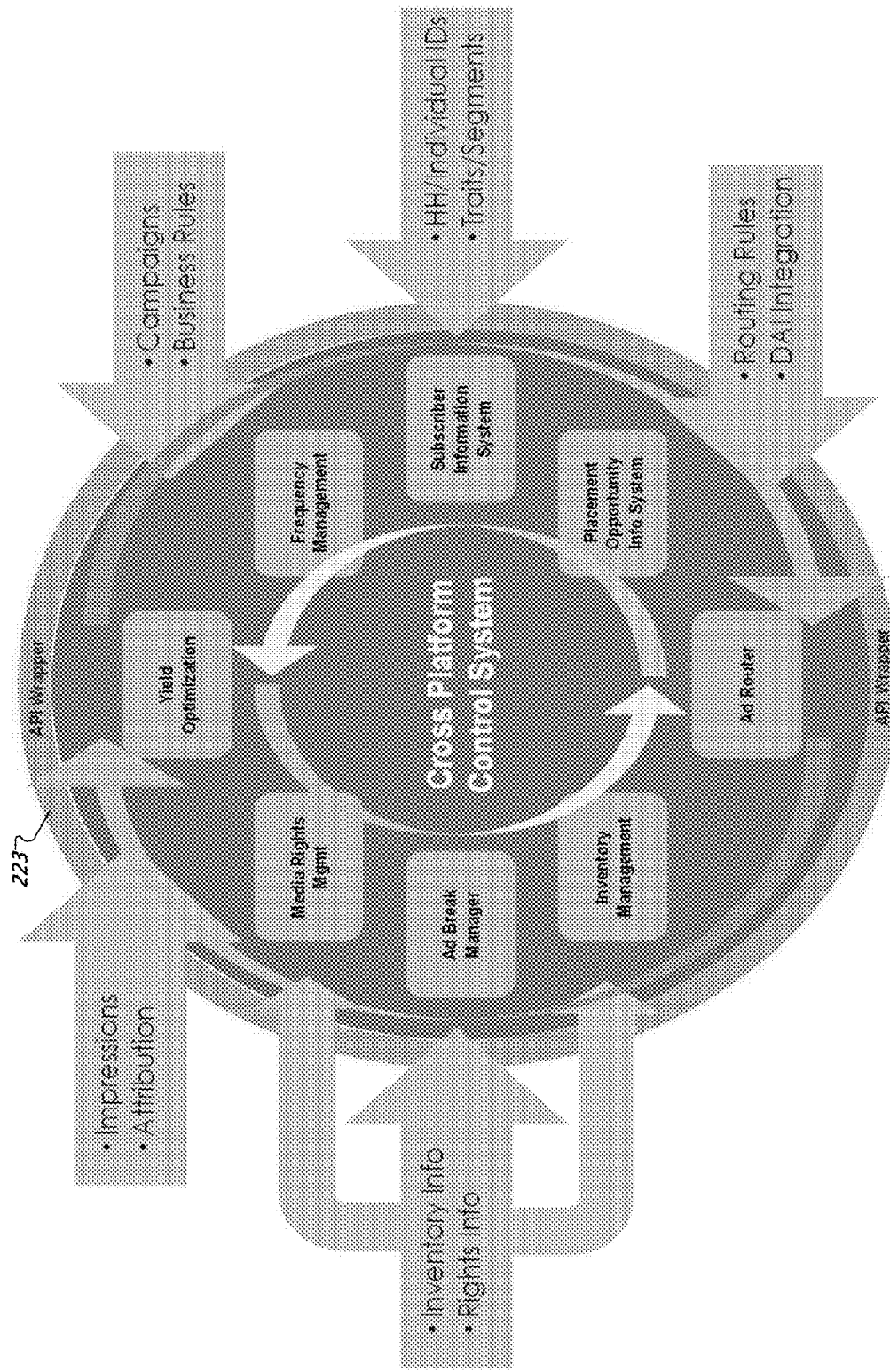
FIG. 2E is a block diagram illustrating an example, non-limiting embodiment of functionality and data flow in a system within or in conjunction with the communication network of FIG. 1 and the systems of FIG. 2A-2D, 2F-2G, 2I in accordance with various aspects described herein.

FIG. 2E depicts an illustrative embodiment of a data flow 265 that can be utilized by one or more of the systems 100, 200, 240, 250 of FIGS. 1, 2A, 2B, 2C, 2D (or one or more components thereof). In one embodiment, the data flow 265 utilizes the API wrapper 223 so that various information can flow between devices, including between first devices that are operating within the platform (and/or managed by the provider managing the platform) and second devices that are operating outside of the platform (and/or managed by other entities different from the provider managing the platform).

Data flow 265 can represent a multi-tenancy platform where multiple entities (e.g., different content providers) can communicate their advertising needs to multiple multichannel video programming distributors (MVPDs) utilizing multiple dynamic ad insertion (DAI) vendors, such as through use of a set of API's and drop-off points for files.

Figure 2F:
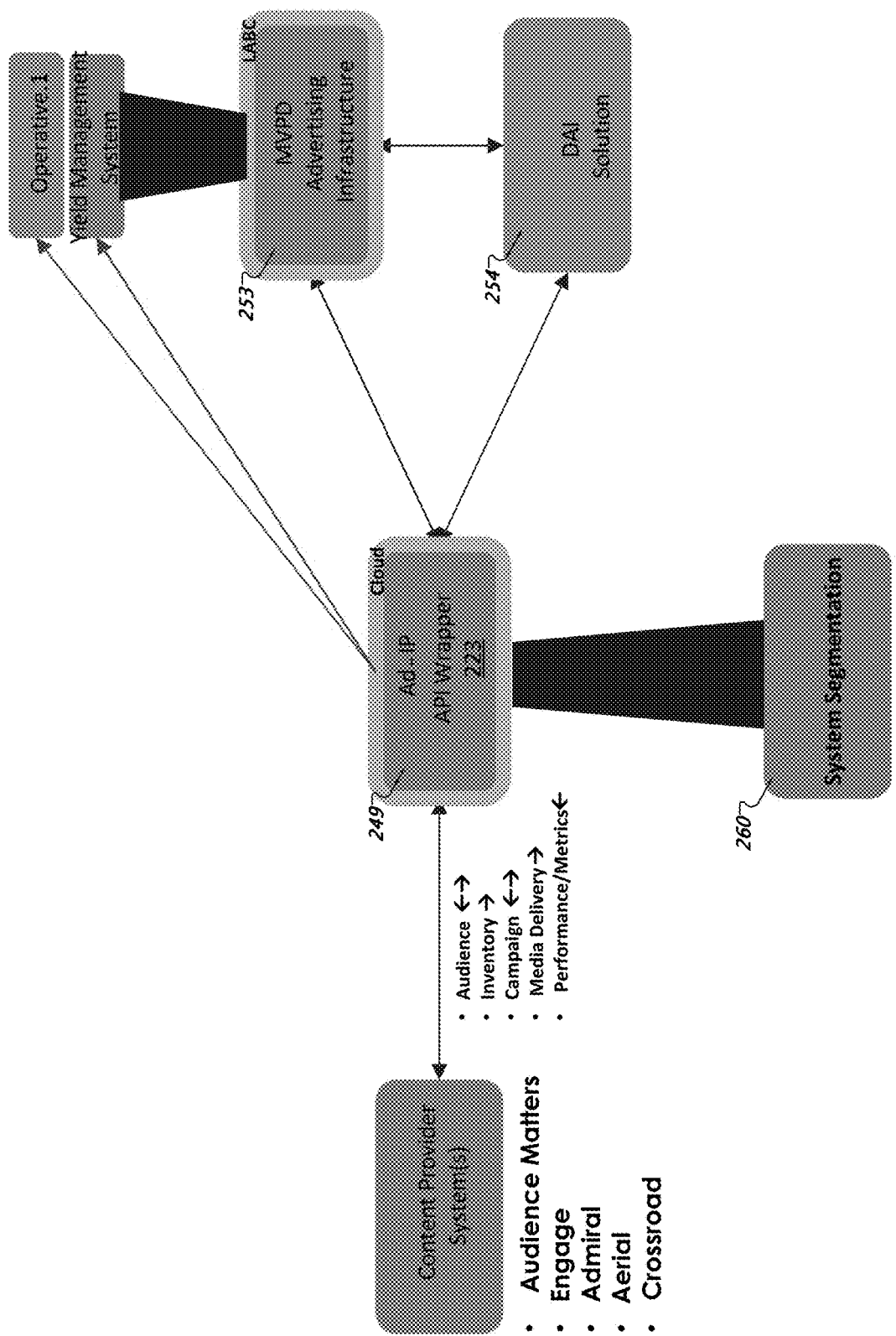
FIG. 2F is a block diagram illustrating an example, non-limiting embodiment of a system functioning within or in conjunction with the communication network of FIG. 1 and the system of FIG. 2A-2D, 2G, 2I in accordance with various aspects described herein.

FIG. 2F depicts an illustrative embodiment of a system 270. System 270 can be part of, or can operate in conjunction with, the systems 100, 200, 240, 250, 255 of FIGS. 1, 2A, 2B, 2C and 2D (or one or more components thereof) and can make use of the data flow 265 of FIG. 2E. System 270 can include various components, systems, and/or functionality only some of which are shown including equipment of content providers, middleware 249 (illustrated as in the cloud although other architectures can be utilized) including the API wrapper 223 that can provide platform integration for various systems, devices, module and/or functionality including system segmentation 260, yield optimization, MVPD advertising infrastructure 253 and a DAI solution 254. These various components, systems, and/or functionality described above can operate in various configurations including distributed and centralized configurations, and configurations other than what is illustrated in FIG. 2F can also be utilized.

System 270 illustrates the flow of information via the API wrapper 223 to and from the equipment of the content provider including audience data, inventory data, campaign data, media delivery data, and performance/metrics data. System 270, through use of the API wrapper 223, provides the content provider systems with access to the selected MVPD advertising infrastructure(s) 253 and the selected DAI solution(s) 254, while allowing for segmentation data and yield management data to be utilized as part of the ad insertion process and management of ad delivery.

Figure 2G:
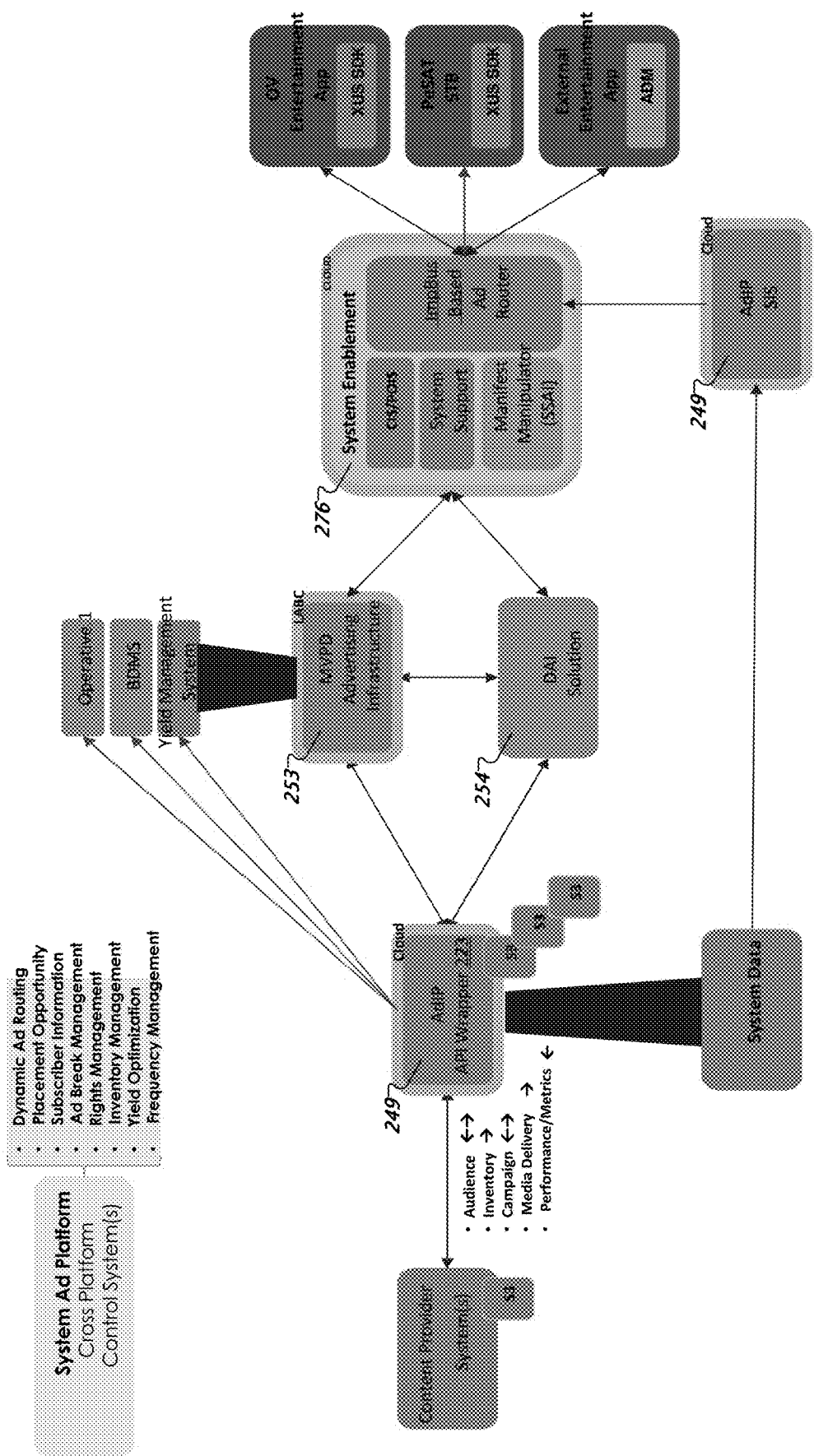
FIG. 2G is a block diagram illustrating an example, non-limiting embodiment of a system functioning within or in conjunction with the communication network of FIG. 1 and the systems of FIG. 2A-2D, 2F, 2I in accordance with various aspects described herein.

FIG. 2G depicts an illustrative embodiment of a system 275. System 275 can be part of, or can operate in conjunction with, the systems 100, 200, 240, 250, 255, 270 of FIGS. 1, 2A, 2B, 2C, 2D and 2F (or one or more components thereof) and can make use of the data flow 265 of FIG. 2E. System 275 can include various components, systems, and/or functionality only some of which are shown including equipment of content providers (having access to s3 buckets), middleware 249 (illustrated as in the cloud although other architectures can be utilized and can have access to S3 buckets) including the API wrapper 223 that can provide platform integration for various systems, devices, module and/or functionality including system data, yield optimization, MVPD advertising infrastructure 253 and a DAI solution 254. These various components, systems, and/or functionality described above can operate in various configurations including distributed and centralized configurations, and configurations other than what is illustrated in FIG. 2G can also be utilized.

System 275 illustrates the flow of information via the API wrapper 223 to and from the equipment of the content provider including audience data, inventory data, campaign data, media delivery data, and performance/metrics data. System 275, through use of the API wrapper 223, provides the content provider systems with access to the selected MVPD advertising infrastructure(s) 253 and the selected DAI solution(s) 254, while allowing for segmentation data and yield management data to be utilized as part of the ad insertion process and management of ad delivery. System 275 further illustrates the flow of data between various systems, devices, module and/or functionality (grouped as 276 and referred to as System Enablement which can be in the cloud and/or in data centers) including the ad router which, in one embodiment, can be operated by or otherwise managed internally by the provider managing the middleware 249 and API wrapper 223 (although other schemes for operational control can be utilized). In one embodiment, the system enablement 276 can interface with various devices or applications for ad delivery including STBs, entertainment applications and so forth, such as through use of an SDK.

Figure 2H:
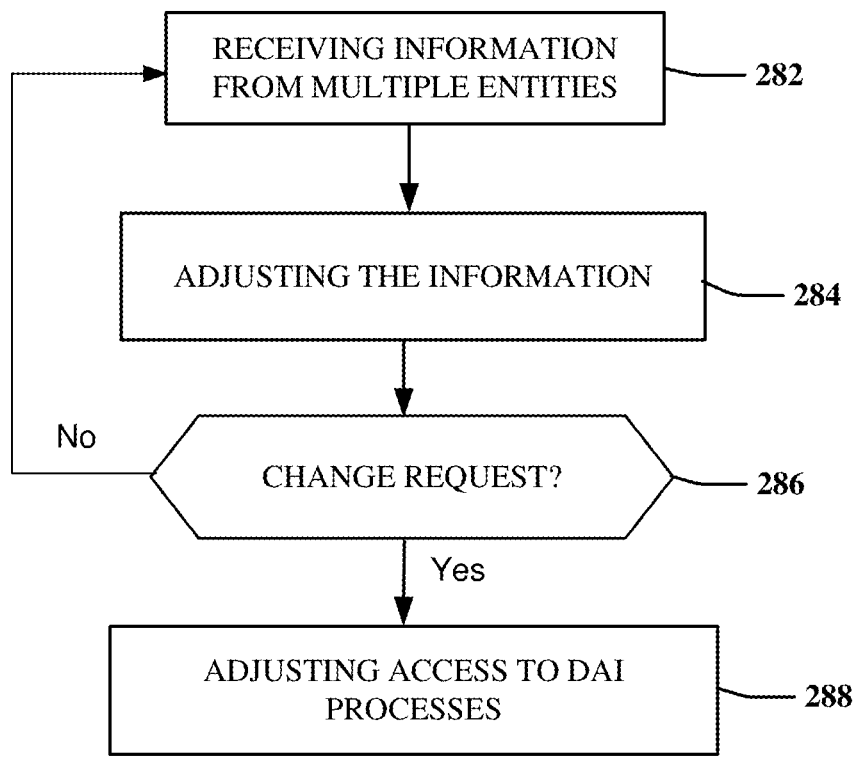
FIG. 2H depicts an illustrative embodiment of a method in accordance with various aspects described herein.

FIG. 2H depicts an illustrative embodiment of a method 280 in accordance with various aspects described herein. At 282, information can be received from various entities. For example, a group of APIs can be provided and the information, via the group of APIs, can be obtained from equipment of a plurality of content providers that are managed by different provider entities. The information can include requests for ad insertions for different content providers. At 284, the information can be adjusted, via the group of APIs, to generate adjusted information that is compatible with a plurality of MVPD advertising infrastructures and compatible with a plurality of DAI processes that are managed by different DAI entities. The adjusted information can enable providing, to each of the equipment of the content providers, access to at least one of the MVPD advertising infrastructures and access to at least one of the DAI processes to facilitate ad insertion. At 286, detection or determination of a change request associated with inventory of one or more particular content providers can be made. At 288, access can be provided to the equipment of the particular content provider(s) to a different one or more of the DAI processes to facilitate at least some of the ad insertion according to the change request. In one embodiment, access can be provided to the equipment of the particular content provider(s) to one or more different ones of the MVPD advertising infrastructures according to the change request. In one embodiment, the change request can be based on changing an inventory type for at least a portion of the ad insertion. In one embodiment, the change request can be based on changing an inventory type associated with an ad campaign. In one embodiment, the change request can be according to a yield analysis of the inventory that increases revenue for the content provider for the inventory. In one embodiment, the providing the access to the one or more DAI processes comprises providing access to multiple DAI processes, where one or more of the multiple DAI processes is selected by equipment of the particular content provider. In one embodiment, at least one of the multiple DAI processes is identified in a recommendation provided to the first equipment by the processing system. In one embodiment, the recommendation identifying the at least one of the multiple DAI processes is according to historical yield data. In one embodiment, the providing the access to the different one of the DAI processes is based on replacing a first DAI process with a second DAI process. In one embodiment, the second DAI process is selected based on a selection received from equipment of a content provider.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2I:
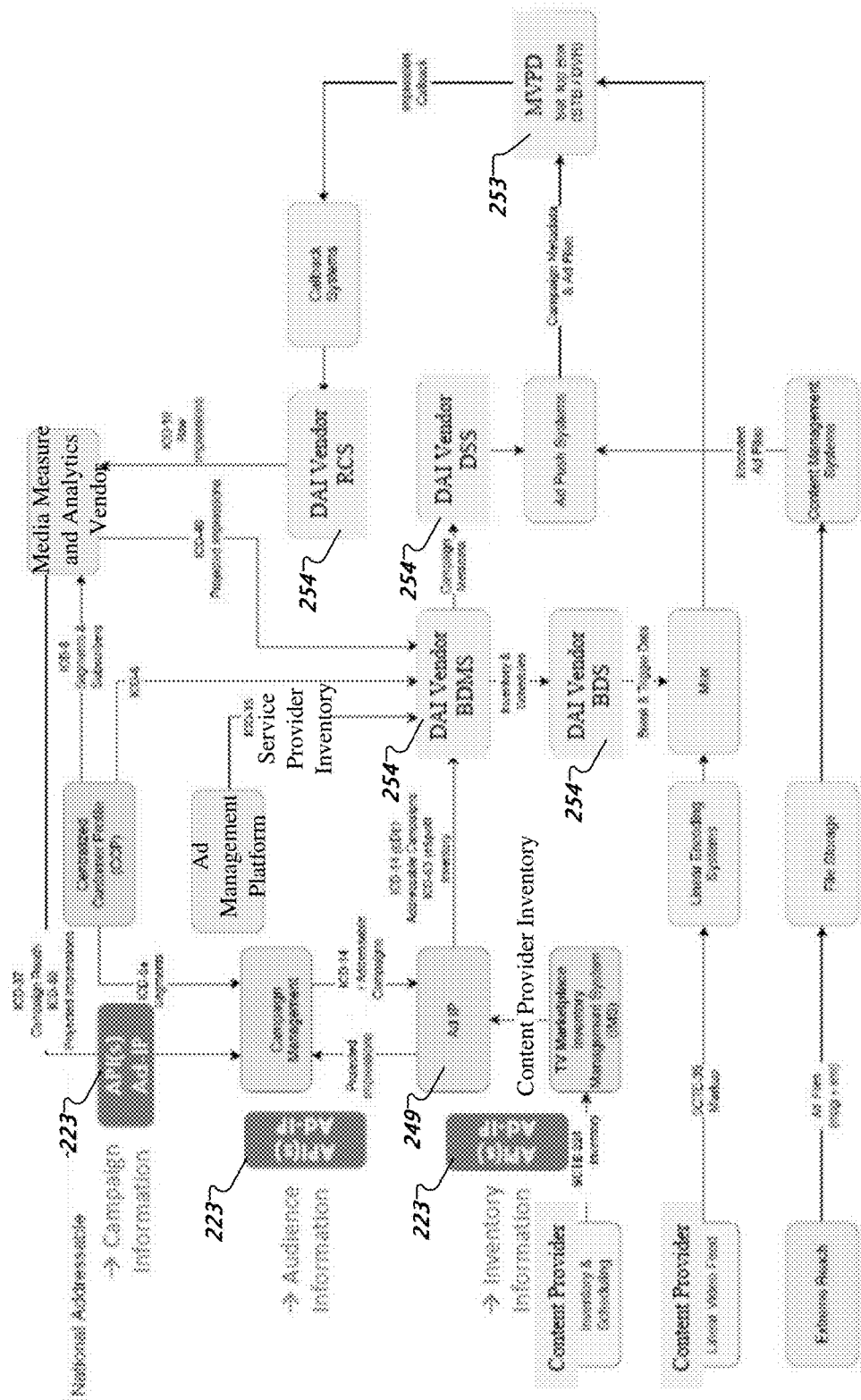
FIG. 2I is a block diagram illustrating an example, non-limiting embodiment of a system in accordance with various aspects described herein.

FIG. 2I depicts an illustrative embodiment of a system 290. System 290 can be part of, or can operate in conjunction with, the systems 100, 200, 240, 250, 255, 270, 275 of FIGS. 1, 2A, 2B, 2C, 2D, 2F and 2G (or one or more components thereof) and can make use of the data flow 265 of FIG. 2E. System 290 can include various components, systems, and/or functionality only some of which are shown including equipment of a content provider(s), middleware (Ad-IP) 249 including a set of APIs in an API wrapper 223 that can provide platform integration for various systems, devices, module and/or functionality including yield optimization, equipment (e.g., STBs) of an MVPD advertising infrastructure(s) 253 and a DAI solution(s) 254. These various components, systems, and/or functionality described above can operate in various configurations including distributed and centralized configurations, and configurations other than what is illustrated in FIG. 2I can also be utilized.

System 290 illustrates the set of APIs enabling the flow of information (i.e., the API wrapper 223) including campaign information, audience information, and inventory information, so that a content provider can utilize a selected particular MVPD advertising infrastructure 253 along with a selected particular DAI solution 254 for ad insertion. In this example, system 290 represents a national addressable configuration which includes a content provider linear video feed being subject to a particular DAI solution(s) 254 (e.g., Big Data Management System, Break Detection Server, RCS, DSS, and so forth) which is enabled based on the API wrapper 223. System 290, through use of the API wrapper 223, provides the content provider system(s) with access to the selected MVPD advertising infrastructure(s) 253 and the selected DAI solution(s) 254, while allowing for segmentation data and yield management data to be utilized as part of the ad insertion process and management of ad delivery.

As an example, system 290 can enable an advertising campaign to be defined. In some embodiments, the creation of the ad campaign can include receiving inventory, such as various advertising materials. In addition, the creation of the ad campaign can include receiving a definition of the market segment or subscription segment to be reached. In some embodiments, the advertiser can be provided with an interactive portal or interface with which the advertiser can manage the campaign. System 290 enables the various subscribers that match the segments defined by the advertising objectives to be determined, such as through various databases of a content provider or other source to be searched to find appropriate subscribers. Identified subscribers matching a campaign objective can be monitored, which may or may not include determining a location of the subscriber, a device the subscriber is currently accessing, and/or the content that the subscriber is consuming.

In one embodiment during the monitoring, content can be monitored for upcoming breaks and/or a decision can be made to interject an advertising break into content that would otherwise have no breaks, such as if the subscriber were using an application or viewing OTT content. A determination can be made as to which ad content from among the inventory of advertisements for the ad campaign should be inserted into the consumed content. In one embodiment, an identity or address of a subscriber device can be determined (e.g., a subscriber could be watching live streaming TV on a STB or an OTT delivery of media content on a mobile phone). In other embodiments, the subscriber could be engaging social media through an application being performed on another device type and an appropriate ad can be selected for the subscriber and the device type. In these various examples, as well as other scenarios, the advertising content can then be inserted into the content being consumed by the subscriber.

In one embodiment, consumption of the advertising content can be analyzed and metrics can be determined for the efficacy of the content. In some embodiments, it can be determined if the subscriber used the advertising content to seek additional input or information. In other embodiments, behavior of a subscriber can be measured to determine if the advertising content was ignored (e.g., the device was adjusted during the presentation). Metrics can be fed back through the system 290 to further refine the determination of advertising content and/or can be utilized for other purposes. For example, the metrics (or a derivative report thereof) can be delivered to the client, including in a billing statement, feedback on the performance of the advertising content with the subscriber, feedback on the performance across all targeted subscribers for the selected subscriber segments, and so forth. In one embodiment, metrics can be provided to a yield optimization system to allow for adjustments of the advertising campaign. These adjustments can result in use of different DAI solutions and/or different MVPD advertising infrastructures, the change to which is facilitated through use of the API wrapper 223.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, 240, 250, 255, 270, 275, 290, data flow 265 and method 280 presented in FIGS. 1, and 2A-2I.

For example, virtualized communication network 300 can facilitate in whole or in part: receiving, via APIs, information from a plurality of equipment that is each managed by different entities where the information includes requests for ad insertions; adjusting, via the APIs, the information to generate adjusted information that is compatible with some or all accessible MVPD advertising infrastructures and compatible with some or all accessible DAI processes that are managed by different DAI entities; providing, to each of the plurality of equipment, access to at least one of the MVPD advertising infrastructures and access to at least one of the DAI processes to facilitate ad insertion; determining a change request associated with inventory; and providing, to a first equipment of the plurality of equipment, access to a different one of the DAI processes and/or a different one of the MVPD advertising infrastructures to facilitate at least some of the ad insertion according to the change request.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages APIs; reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
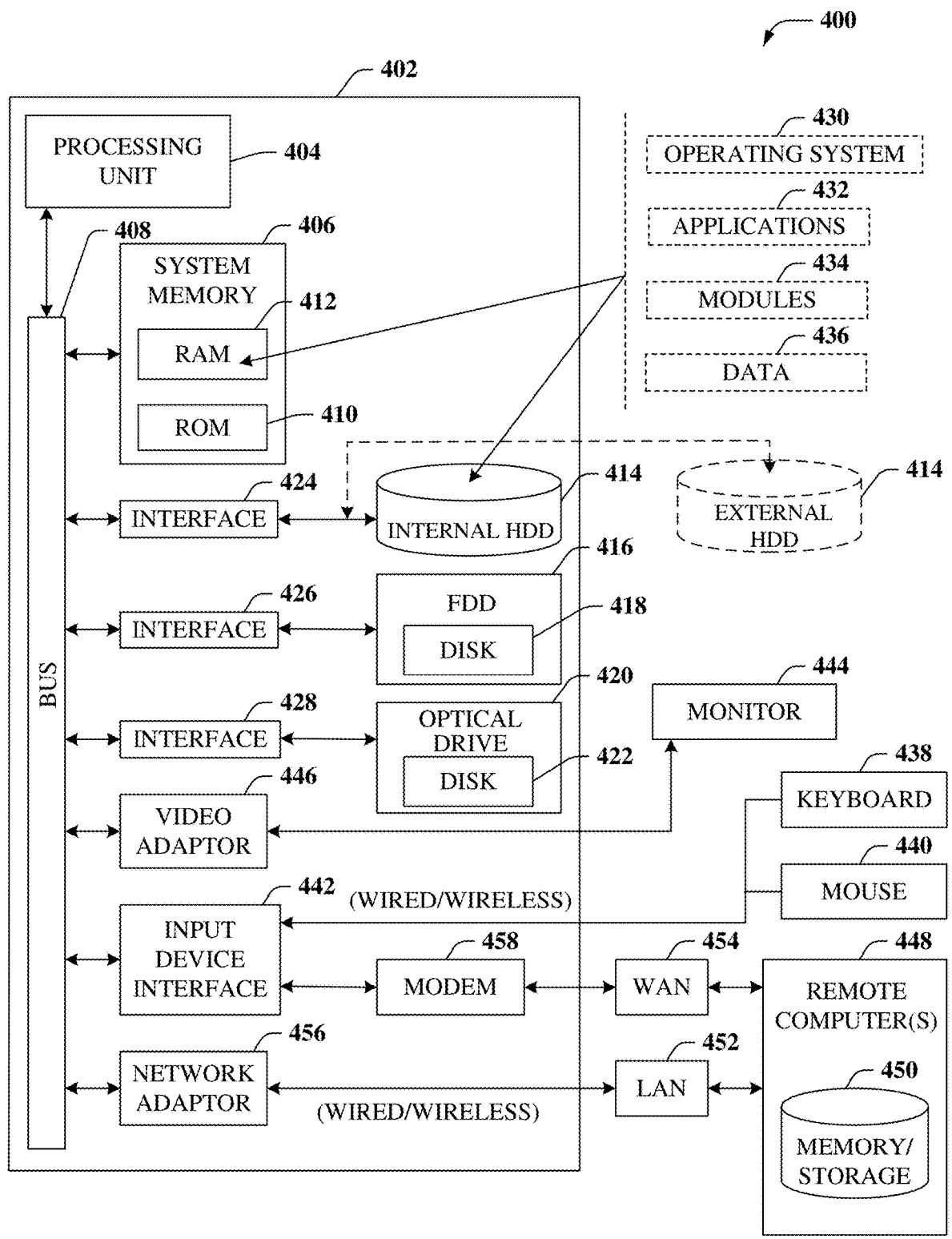
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part: receiving information from a plurality of equipment that is each managed by different entities where the information includes requests for ad insertions; adjusting the information to generate adjusted information that is compatible with MVPD advertising infrastructures and compatible with DAI processes that are managed by different DAI entities; providing, to each of the plurality of equipment, access to at least one of the MVPD advertising infrastructures and access to at least one of the DAI processes to facilitate ad insertion; determining a change request associated with inventory; and providing, to a first equipment of the plurality of equipment, access to a different one of the DAI processes and/or a different one of the MVPD advertising infrastructures to facilitate at least some of the ad insertion according to the change request.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
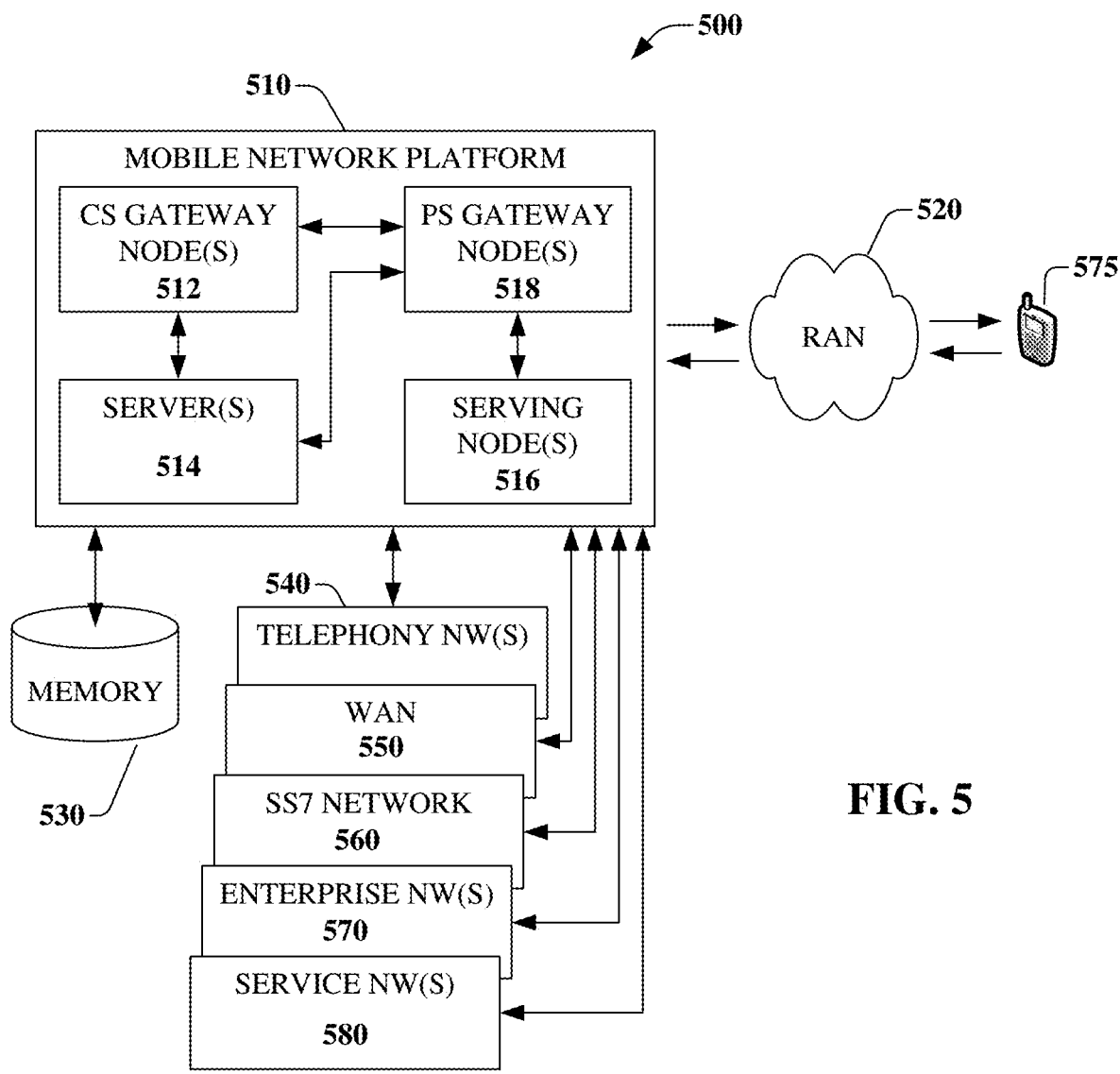
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part: receiving information from a plurality of equipment that is each managed by different entities where the information includes requests for ad insertions; adjusting the information to generate adjusted information that is compatible with MVPD advertising infrastructures and compatible with DAI processes that are managed by different DAI entities; providing, to each of the plurality of equipment, access to at least one of the MVPD advertising infrastructures and access to at least one of the DAI processes to facilitate ad insertion; determining a change request associated with inventory; and providing, to a first equipment of the plurality of equipment, access to a different one of the DAI processes and/or a different one of the MVPD advertising infrastructures to facilitate at least some of the ad insertion according to the change request. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
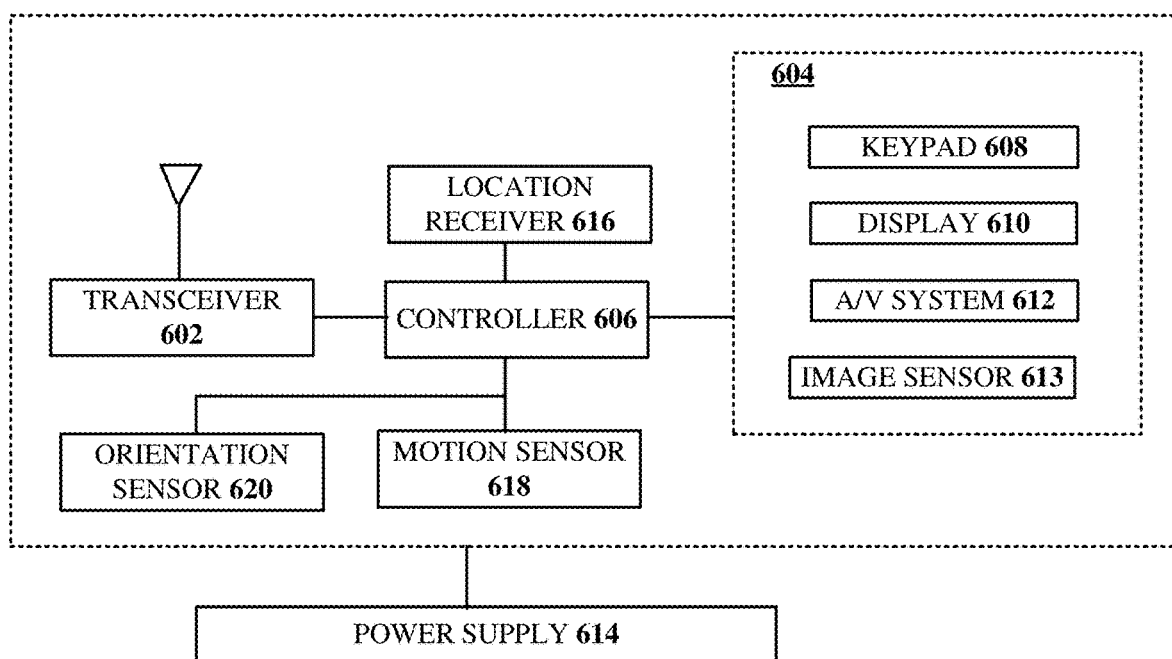
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part: receiving information from a plurality of equipment that is each managed by different entities where the information includes requests for ad insertions; adjusting the information to generate adjusted information that is compatible with MVPD advertising infrastructures and compatible with DAI processes that are managed by different DAI entities; providing, to each of the plurality of equipment, access to at least one of the MVPD advertising infrastructures and access to at least one of the DAI processes to facilitate ad insertion; determining a change request associated with inventory; and providing, to a first equipment of the plurality of equipment, access to a different one of the DAI processes and/or a different one of the MVPD advertising infrastructures to facilitate at least some of the ad insertion according to the change request.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue"

indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    providing, by a processing system including a processor, a group of application program interfaces (APIs);
    receiving, by the processing system via the group of APIs, information from equipment of a plurality of content providers that are managed by different provider entities, the information including first information from first equipment of a first content provider and second information from second equipment of a second content provider, the first and second information including requests for ad insertions for the first and second content providers, respectively, wherein not all of the requests for ad insertions for the first and second content providers are compatible with a plurality of multichannel video programming distributor (MVPD) advertising infrastructures;
    adjusting, by the processing system via the group of APIs, the first and second information to generate adjusted first information and adjusted second information, the adjusted first and second information including adjusted requests for ad insertions being compatible with the plurality of multichannel video programming distributor (MVPD) advertising infrastructures and compatible with a plurality of dynamic advertising insertion (DAI) processes that are managed by different DAI entities;
    providing, by the processing system to each of the first and second equipment, access to at least one of the MVPD advertising infrastructures and access to at least one of the DAI processes to facilitate ad insertion;
    determining, by the processing system, a change request associated with inventory of the first content provider, wherein the change request is based on changing an inventory type for at least a portion of the ad insertion; and
    providing, by the processing system to the first equipment, access to a different one of the DAI processes to facilitate at least some of the ad insertion according to the change request.

2. The method of claim 1, comprising providing, by the processing system to the first equipment, access to a different one of the MVPD advertising infrastructures according to the change request.

3. The method of claim 1, wherein the change request is according to a yield analysis of the inventory that increases revenue for the content provider for the inventory.

4. The method of claim 1, wherein the providing the access to the at least one of the DAI processes comprises providing access to multiple DAI processes, wherein one or more of the multiple DAI processes is selected by the first equipment of the first content provider.

5. The method of claim 1, wherein the providing the access to the different one of the DAI processes is based on replacing a first DAI process with a second DAI process.

6. The method of claim 1, wherein the information from the equipment of the plurality of content providers includes inventory data describing inventory available for a group of ad insertions and includes audience targeting data.

7. The method of claim 1, comprising providing, by the processing system via the group of APIs, performance information to the equipment of the plurality of content providers, wherein the performance information is associated with a plurality of ad insertions performed by one or more of the DAI processes, and wherein the performance information is translated by the group of APIs from performance data generated by the one or more of the DAI processes.

8. The method of claim 2, wherein the change request is further based on changing an inventory type associated with an ad campaign.

9. The method of claim 4, wherein at least one of the multiple DAI processes is identified in a recommendation provided to the first equipment by the processing system.

10. The method of claim 9, wherein the recommendation identifying the at least one of the multiple DAI processes is according to historical yield data.

11. The method of claim 5, wherein the second DAI process is selected based on a selection received from the first equipment.

12. A server, comprising:
    a processing system including a processor; and
    a memory that stores executable instructions that, when executed by the processing system, facilitate performance of operations, the operations comprising:
        receiving, via a group of application programming interfaces (APIs), information from a plurality of equipment that is each managed by different entities, the information including requests for ad insertions, wherein not all of the requests for ad insertions are compatible with a plurality of multichannel video programming distributor (MVPD) advertising infrastructures;

adjusting, via the group of APIs, the information to generate adjusted information including adjusted requests for ad insertions that is compatible with the plurality of multichannel video programming distributor (MVPD) advertising infrastructures and compatible with a plurality of dynamic advertising insertion (DAI) processes that are managed by different DAI entities;

providing, to each of the plurality of equipment, access to at least one of the MVPD advertising infrastructures and access to at least one of the DAI processes to facilitate ad insertion;

determining a change request associated with inventory, wherein the change request is based on changing an inventory type for at least a portion of the ad insertion; and providing, to a first equipment of the plurality of equipment, access to a different one of the DAI processes to facilitate at least some of the ad insertion according to the change request.

13. The server of claim 12, wherein the operations comprise providing, to the first equipment, access to a different one of the MVPD advertising infrastructures according to the change request.

14. The server of claim 12, wherein the change request is further based on changing an inventory type associated with an ad campaign, and wherein the change request is according to a yield analysis of the inventory that increases revenue for a content provider for the inventory.

15. The server of claim 12, wherein the providing the access to the at least one of the DAI processes comprises providing access to multiple DAI processes, wherein one or more of the multiple DAI processes is selected by the first equipment.

16. The server of claim 12, wherein the operations comprise providing, via the group of APIs, performance information to the plurality of equipment, wherein the performance information is associated with a plurality of ad insertions performed by one or more of the DAI processes, and wherein the performance information is translated by the group of APIs from performance data generated by the one or more of the DAI processes.

17. A non-transitory, machine-readable medium, comprising executable instructions that, when executed by a processing system including a processor, facilitate performance of operations, the operations comprising:

receiving information from a plurality of equipment that is each managed by different entities, the information including requests for ad insertions, wherein not all of the requests for ad insertions are compatible with a plurality of multichannel video programming distributor (MVPD) advertising infrastructures;

adjusting the information to generate adjusted information including adjusted requests for ad insertions that is compatible with the plurality of multichannel video programming distributor (MVPD) advertising infrastructures and compatible with a plurality of dynamic advertising insertion (DAI) processes that are managed by different DAI entities;

providing, to each of the plurality of equipment, access to at least one of the MVPD advertising infrastructures and access to at least one of the DAI processes to facilitate ad insertion;

determining a change request associated with inventory, wherein the change request is based on changing an inventory type for at least a portion of the ad insertion; and providing, to a first equipment of the plurality of equipment, access to a different one of the DAI processes to facilitate at least some of the ad insertion according to the change request.

18. The non-transitory, machine-readable medium of claim 17, wherein the operations comprise providing performance information to the plurality of equipment, wherein the performance information is associated with a plurality of ad insertions performed by one or more of the DAI processes, and wherein the performance information is translated from performance data generated by the one or more of the DAI processes.

19. The non-transitory, machine-readable medium of claim 17, wherein the operations comprise providing, to the first equipment, access to a different one of the MVPD advertising infrastructures according to the change request.

20. The non-transitory, machine-readable medium of claim 17, wherein the providing the access to the at least one of the DAI processes comprises providing access to multiple DAI processes, wherein one or more of the multiple DAI processes is selected by the first equipment.

* * * * *